(12) United States Patent
Ueno et al.

(10) Patent No.: US 10,525,342 B2
(45) Date of Patent: Jan. 7, 2020

(54) INFORMATION PROCESSING DEVICE AND RECORDING MEDIUM

(71) Applicant: SHARP KABUSHIKI KAISHA, Sakai, Osaka (JP)

(72) Inventors: Masafumi Ueno, Sakai (JP); Naoki Shiobara, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/574,981

(22) PCT Filed: Mar. 9, 2016

(86) PCT No.: PCT/JP2016/057452
§ 371 (c)(1),
(2) Date: Nov. 17, 2017

(87) PCT Pub. No.: WO2016/185768
PCT Pub. Date: Nov. 24, 2016

(65) Prior Publication Data
US 2018/0140946 A1 May 24, 2018

(30) Foreign Application Priority Data
May 21, 2015 (JP) .................................. 2015-103918

(51) Int. Cl.
*G06F 3/0486* (2013.01)
*A63F 13/31* (2014.01)
(Continued)

(52) U.S. Cl.
CPC ............ *A63F 13/31* (2014.09); *A63F 13/214* (2014.09); *A63F 13/2145* (2014.09);
(Continued)

(58) Field of Classification Search
CPC .... H04N 1/00108; H04N 1/04; G06F 17/243; G06F 3/0416; G06F 3/0487;
(Continued)

(56) References Cited

U.S. PATENT DOCUMENTS

| 2007/0015588 A1 | 1/2007 | Matsumoto et al. |
| 2010/0004062 A1 | 1/2010 | Maharbiz et al. |

(Continued)

FOREIGN PATENT DOCUMENTS

| JP | 2004-337504 A | 12/2004 |
| JP | 2010-102531 A | 5/2010 |

(Continued)

*Primary Examiner* — Amit Chatly
(74) *Attorney, Agent, or Firm* — ScienBiziP, P.C.

(57) ABSTRACT

A process is performed by linking communication information acquired by Near field radio communication from a client device with position information of the client device. An information processing device (1) includes an association unit (211) configured to: acquire via an NFC unit (112) configured to perform Near field radio communication, terminal information held by an NFC terminal; acquire touch information including information on a position on the touch panel (111), the NFC terminal coming into contact with the position; and associate the terminal information and the touch information and store a result of the association.

9 Claims, 18 Drawing Sheets

(51) Int. Cl.

| | |
|---|---|
| *G06F 3/0488* | (2013.01) |
| *G06F 3/0487* | (2013.01) |
| *G06F 3/041* | (2006.01) |
| *G07F 17/32* | (2006.01) |
| *A63F 13/214* | (2014.01) |
| *A63F 13/2145* | (2014.01) |
| *A63F 13/822* | (2014.01) |
| *A63F 13/92* | (2014.01) |
| *H04B 5/00* | (2006.01) |
| *G06F 3/044* | (2006.01) |

(52) U.S. Cl.
CPC ............ *A63F 13/822* (2014.09); *A63F 13/92* (2014.09); *G06F 3/0412* (2013.01); *G06F 3/0416* (2013.01); *G06F 3/0487* (2013.01); *G06F 3/0488* (2013.01); *G07F 17/3209* (2013.01); *G07F 17/3211* (2013.01); *H04B 5/0025* (2013.01); *G06F 3/044* (2013.01); *G06F 2203/04808* (2013.01); *G07F 17/3293* (2013.01)

(58) Field of Classification Search
CPC .................. G06F 3/0412; G06F 3/0488; G06F 2203/04808; G06F 3/044; A63F 13/31; A63F 13/2145; A63F 13/92; A63F 13/822; A63F 13/214; G07F 17/32; H04B 5/0025

See application file for complete search history.

(56) References Cited

U.S. PATENT DOCUMENTS

| | | |
|---|---|---|
| 2010/0331083 A1 | 12/2010 | Maharbiz et al. |
| 2012/0049453 A1 | 3/2012 | Morichau-Beauchant et al. |
| 2012/0052931 A1 | 3/2012 | Jaqua et al. |
| 2012/0052934 A1 | 3/2012 | Maharbiz et al. |
| 2012/0056717 A1 | 3/2012 | Maharbiz et al. |
| 2013/0201106 A1* | 8/2013 | Naccache ............ G06F 3/0481 345/158 |
| 2015/0036185 A1 | 2/2015 | Asai |
| 2016/0050324 A1* | 2/2016 | Ohshita .............. H04N 1/00108 358/1.15 |

FOREIGN PATENT DOCUMENTS

| | | |
|---|---|---|
| JP | 2013-114374 A | 6/2013 |
| JP | 2013-540471 A | 11/2013 |
| JP | 2015-032057 A | 2/2015 |

\* cited by examiner

| TOUCH ID | T0001 |
|---|---|
| TOUCH COORDINATE | (X, Y) = (50, 50) |
| SIZE | (H, W) = (40, 80) |
| ANGLE | 30 |
| SHAPE CODE | 01 (RECTANGLE) |

| TOUCH ID | T0001 |
|---|---|
| TOUCH COORDINATE | (X, Y) = (50, 50) |
| SIZE | (H, W) = (40, 80) |
| ANGLE | 30 |
| SHAPE CODE | 03 (ELLIPSE) |

FIG. 6A

| TOUCH ID | T0001 |
|---|---|
| TOUCH COORDINATE | (X, Y) = (50, 50) |
| SIZE | (H, W) = (40, 80) |
| ANGLE | 30 |
| SHAPE CODE | 01 (RECTANGLE) |

FIG. 6B

| TOUCH ID | T0001 |
|---|---|
| TOUCH COORDINATE | (X, Y) = (100, 80) |
| SIZE | (H, W) = (40, 80) |
| ANGLE | 50 |
| SHAPE CODE | 01 (RECTANGLE) |

FIG. 7A

| NFC TERMINAL ID | N0001 |
|---|---|
| ANTENNA ID | A0001 |
| TERMINAL TYPE | CARD |
| TERMINAL DATA | 7 OF HEARTS |

| TOUCH ID | T0001 |
|---|---|
| TOUCH COORDINATE | (X, Y) = (50, 50) |
| SIZE | (H, W) = (40, 80) |
| ANGLE | 30 |
| SHAPE CODE | 01 (RECTANGLE) |
| NFC TERMINAL ID | N0001 |
| ANTENNA ID | A0001 |
| TERMINAL TYPE | CARD |
| TERMINAL DATA | 7 OF HEARTS |

| TOUCH ID | T0002 |
|---|---|
| TOUCH COORDINATE | (X, Y) = (20, 40) |
| SIZE | (H, W) = (40, 80) |
| ANGLE | 40 |
| NFC TERMINAL ID | N0001 |
| ANTENNA ID | A0001 |
| TERMINAL TYPE | CARD |
| TERMINAL DATA | 7 OF HEARTS |

INFORMATION PROCESSING DEVICE AND RECORDING MEDIUM

TECHNICAL FIELD

The present invention relates to an information processing device and the like configured to process information acquired from a client device through Near field radio communication by a display device including a communication unit configured to perform Near field radio communication.

BACKGROUND ART

In recent years, the development of a display incorporating a transparent antenna for Near field radio communication (NFC, hereinafter), as described in PTL 1 below, is proceeding. The display enables communication by mounting a transparent antenna layer on a front side thereof when a client device (an NFC terminal such as a smart phone mounted with an NFC function and a card mounted with an NFC function) is brought near the display surface of the display.

Furthermore, as described in PTL 2 below, in a multi-function device including an antenna, a technology has been developed by which a process selected by a user is specified based on a change in a communication state of each antenna, caused by moving an NFC terminal in the vicinity of the antenna by the user.

CITATION LIST

Patent Literature

PTL 1: JP 2010-102531 A (published on May 6, 2010)
PTL 2: JP 2015-032057 A (published on Feb. 16, 2015)

SUMMARY OF INVENTION

Technical Problem

However, there is a problem that the display disclosed in the above-mentioned PTL 1 cannot recognize a location of the NFC terminal when the NFC terminal is moved after the communication. Here, in the above-mentioned PTL 2, the process selected by the user is specified according to the movement of the NFC terminal, but the range of the movement is limited. In other words, it is insufficient for performing a process by linking communication information acquired through communication from an NFC terminal with position information of the NFC terminal in the related art.

The present invention is contrived in view of the above-mentioned problems, and provides an information processing device and the like capable of performing a process by linking communication information acquired through Near field radio communication from a client device with position information of the client device.

Solution to Problem

In order to solve the problems described above, an information processing device according to an aspect of the present invention includes: a terminal information acquisition unit configured to acquire, from a client device, via a communication unit configured to perform Near field radio communication, terminal information held by the client device placed over a touch panel; a position information acquisition unit configured to acquire position information including information on a position on the touch panel, the client device coming into contact with or approaching the position; and an association unit configured to associate the terminal information and the position information and store a result of the association.

Furthermore, in order to solve the problems described above, a control method of an information processing device according to an aspect of the present invention includes: a terminal information acquisition step of acquiring from a client device via a communication unit configured to perform Near field radio communication, terminal information held by the client device placed over a touch panel; a position information acquisition step of acquiring position information including information on a position on the touch panel, the client device coming into contact with or approaching the position; and an association step of associating the terminal information and the position information and storing a result of the association.

Advantageous Effects of Invention

According to one aspect of the present invention, an effect is provided in which a process can be performed by linking communication information acquired through Near field radio communication from a client device with position information of the client device.

BRIEF DESCRIPTION OF DRAWINGS

FIG. 6A is a diagram illustrating a specific example of touch information generated when the NFC terminal comes into contact with the touch panel. FIG. 6B illustrates a specific example of touch information when the NFC terminal moves while keeping the contact with the touch panel.

FIG. 7A is a diagram illustrating a specific example of NFC information. FIG. 7B illustrates a specific example of association data.

DESCRIPTION OF EMBODIMENTS

First Embodiment

An embodiment of the present invention will be described below, based on FIGS. 1 to 11.

Information Processing Device 1

Figure 1:
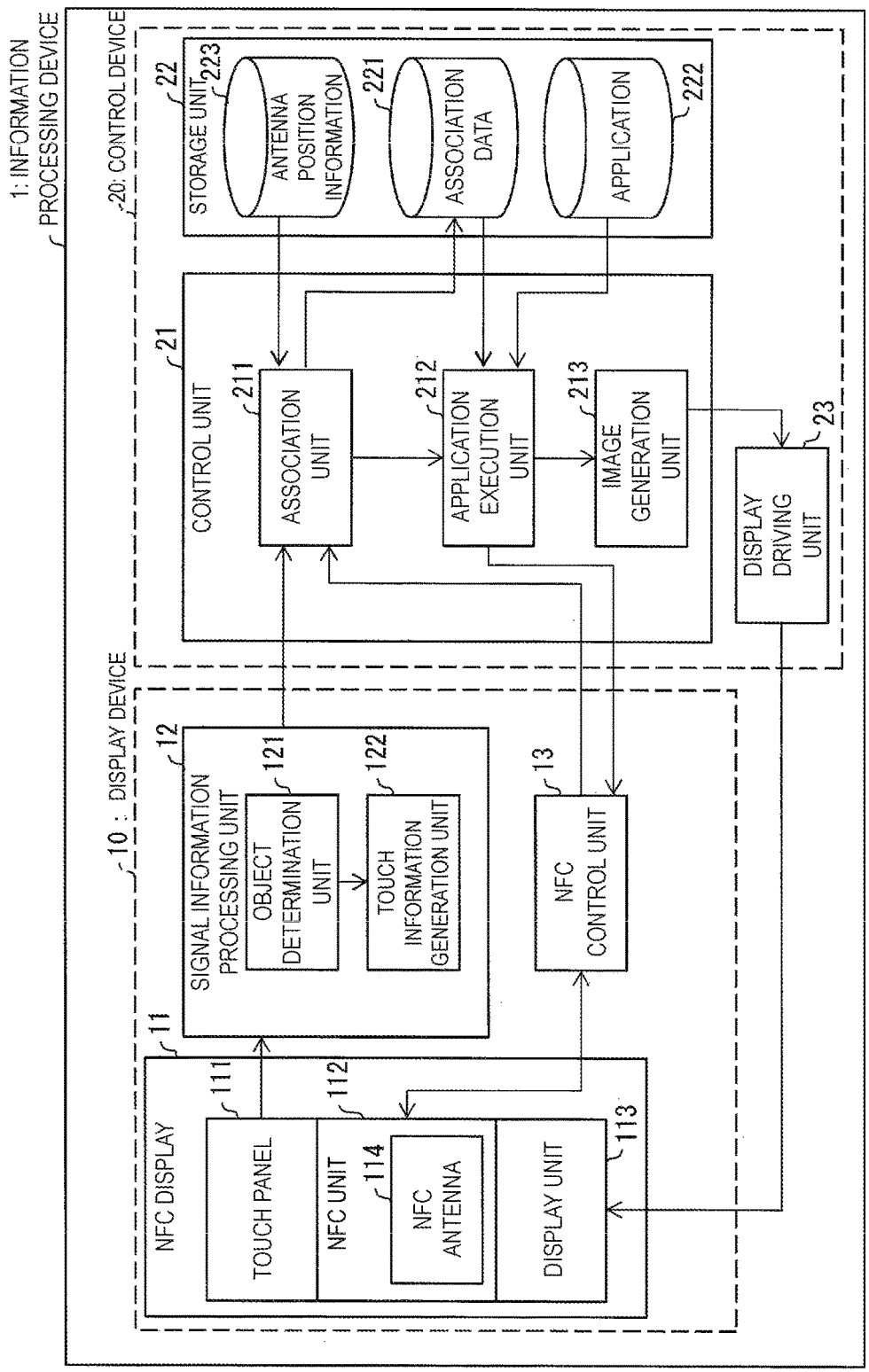
FIG. 1 is a block diagram illustrating an example of a constitution of the main parts of an information processing device according to the present invention.

First, a constitution of the main parts of an information processing device 1 according to the present embodiment will be described with reference to FIG. 1. FIG. 1 is a block diagram illustrating an example of the constitution of the main parts of the information processing device 1. The information processing device 1 integrates a display device 10 configured to display images and a control device 20 configured to control the display device 10, and includes an NFC display 11, a signal information processing unit 12, an NFC control unit 13, a control unit 21, a storage unit 22, and a display driving unit 23.

Note that, in the information processing device 1, the display device 10 may he provided separately from the control device 20. In this case, the display device 10 and the control device 20 transmit and receive information via a communication unit (not illustrated). Note that, information may be transmitted and received by wire or wireless means. Furthermore, the display device 10 and the control device 20 may transmit and receive information via another device such as a router.

The NFC display 11 includes a function of performing Near field radio communication (which may be referred to as NFC hereinafter) with an external device. The NFC display 11 includes a touch panel 111, an NFC unit 112, and a display unit 113. Note that, the NFC refers to short-range radio communication in general, including Near field radio communication and the like utilizing RFID technology such as a contactless IC card or a contactless IC tag.

Figure 2:
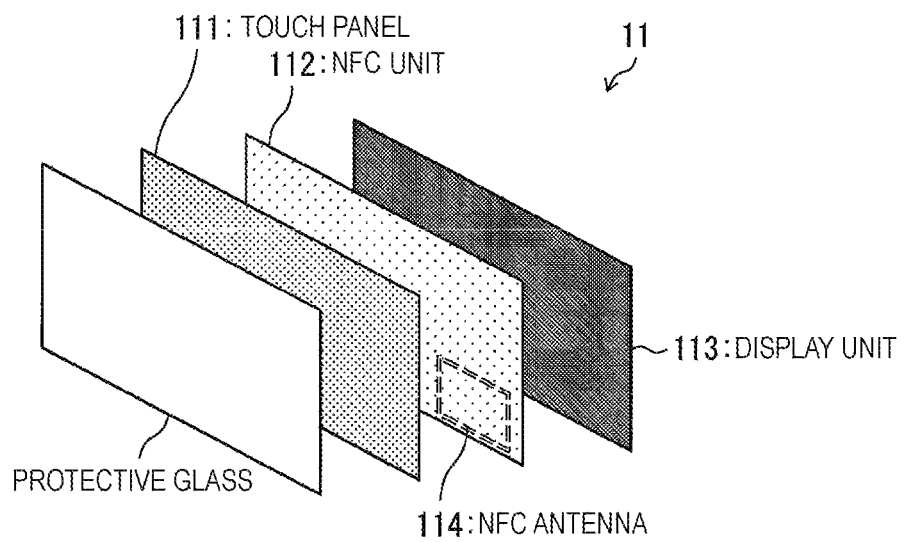
FIG. 2 is a diagram illustrating a detailed constitution of an NFC display illustrated in FIG. 1.

Here, a detailed constitution of the NFC display 11 will be described with reference to FIG. 2. FIG. 2 is a diagram illustrating a detailed constitution of the NFC display 11. As illustrated in FIG. 2, the NFC display 11 has a constitution in which each component overlaps in the following order, starting from the outermost part: protective glass, the touch panel 111, the NFC unit 112, and the display unit 113.

The touch panel 111 is constituted of a touch surface configured to receive a contact of an object, and a touch sensor configured to sense a contact between an indicator and the touch surface and to sense an input position by the contact. The touch sensor may be realized by any type of sensor capable of sensing a contact/non-contact between the indicator and the touch surface. For example, the touch sensor is realized by a pressure sensor, an electrostatic capacity sensor, a light sensor, and the like. Note that, in the present embodiment, description proceeds on the assumption that the touch sensor is an electrostatic capacity sensor. Furthermore, the touch panel 111 may sense, as a contact, a so-called proximity state in which a distance between the touch panel 111 and an object is within a predetermined distance without the object coming into contact.

Figure 3A:
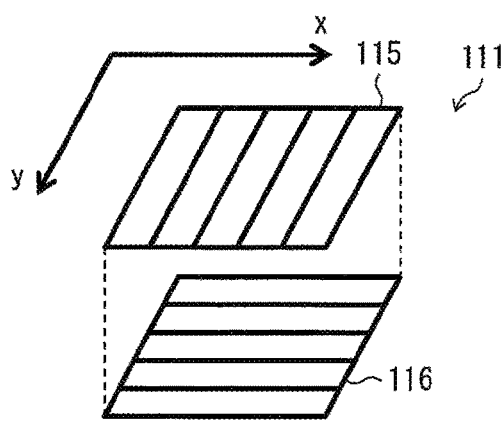
FIGS. 3A and 3B are diagrams for describing a principle of a touch panel illustrated in FIG. 1.
Figure 3B:
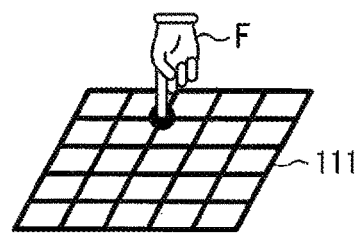
Figure 3C:
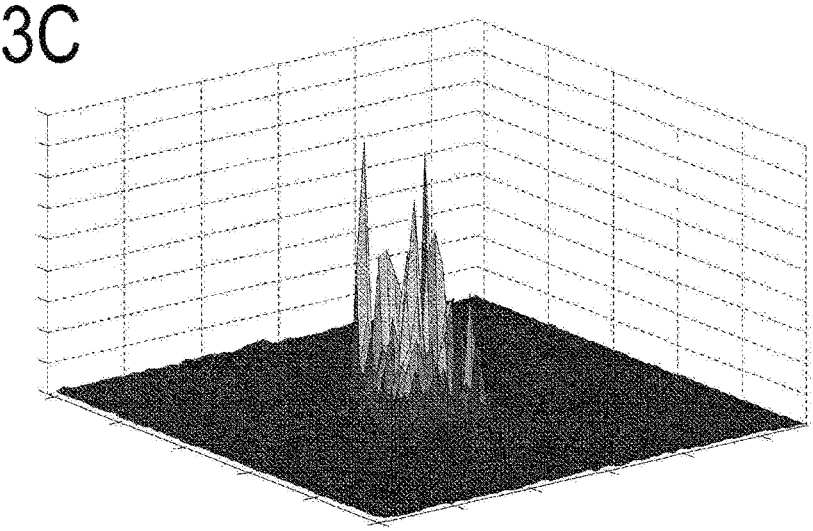
FIGS. 3C and 3D are diagrams illustrating an example of a sensor signal generated when an object comes into contact with the touch panel.
Figure 3D:
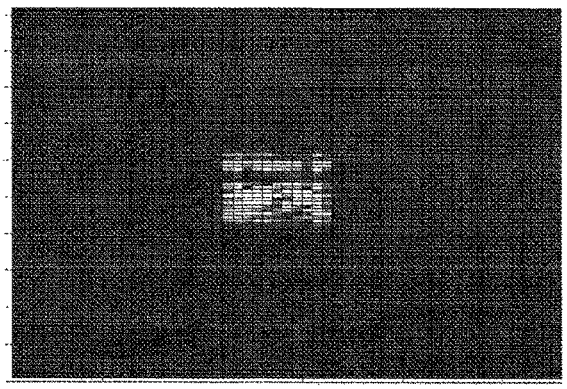

Here, details of the touch panel 111 including an electrostatic capacity sensor, will be described with reference to FIGS. 3A to 3D. FIGS. 3A and 3B are diagrams for describing the principle of the touch panel 111. FIGS. 3C and 3D are diagrams illustrating an example of a sensor signal generated when an object comes into contact with the touch panel 111.

As illustrated in FIG. 3A, the touch panel 111 is formed by overlapping a transparent electrode 115 extending in a Y direction and a transparent electrode 116 extending in an X direction. As illustrated in FIG. 3B, the electrostatic capacity changes as an object having electrical conductivity (a finger F in FIG. 3B) comes into contact with the touch panel 111. In this case, it is possible to specify a coordinate on which the object has come into contact, by detecting between which electrodes the electrostatic capacity has changed.

FIGS. 3C and 3D are diagrams illustrating an example of a sensor signal indicating an extent of change in electrostatic capacity when, as the object, a card with an NFC function comes into contact with the touch panel 111. Note that, the card with an NFC function includes an antenna coil for realizing the NFC function, and the touch panel 111 can detect a contact with the card by the electrical conductivity of the antenna coil.

When the above-mentioned card is brought into contact with the touch panel 111, a sensor signal as illustrated in FIG. 3C is generated. When this is illustrated in top view, as illustrated in FIG. 3D, it can be seen that a sensor signal is generated with the shape of the contact surface of the card (the surface that comes into contact with the touch panel 111). Specifically, a sensor signal of a shape in accordance with the shape of the antenna coil is generated. Note that, when a terminal with an NFC function (an NFC terminal) itself is electrically conductive, a sensor signal of a shape in accordance with the shape of the terminal is generated. The touch panel 111 outputs signal information indicating the sensor signal to the signal information processing unit 12. Specifically, the touch panel 111 outputs signal information to the signal information processing unit 12 at a rate of 60 to 240 times per second.

Note that although not illustrated in the figure, when an indicator such as a finger comes into contact with the touch panel 111, not a widespread sensor signal (in other words, a broad sensor signal) as in FIG. 3C is generated, but a sensor signal in a narrow range (in other words, a narrow sensor signal) is generated.

The NFC unit 112 is a communication device configured to perform Near field radio communication with the outside. The NFC unit 112 includes an NFC antenna 114 (antenna) being a transparent antenna having a function as a tag reader configured to sense an NFC tag to transmit and receive information. Specifically, as illustrated in FIG. 2, the NFC unit 112 is a sheet-shaped member arranged between the touch panel 111 and the display unit 113. Note that, as illustrated in FIG. 2, the NFC unit 112 of the present embodiment includes one NFC antenna 114; however, the number, size, and position of the NFC antenna 114 are not limited to the example of FIG. 2. Furthermore, the position of the NFC unit 112 is not limited to the position between the touch panel 111 and the display unit 113 illustrated in FIG. 2. Moreover, the NFC antenna 114 may be arranged in the touch panel 111 (that is, the touch panel 111 and the NFC unit 112 may be integrated).

The display unit 113 is a display device configured to display, as an image in a display field, information processed by the information processing device 1. The display unit 113 is, for example, a Liquid crystal display (LCD); however, this example is not limiting.

The signal information processing unit 12 processes signal information acquired from the touch panel 111. The signal information processing unit 12 includes an object determination unit 121 and a touch information generation unit 122.

The object determination unit 121 determines whether an object that comes into contact with the touch panel 111, is an indicator such as a finger or a pen, or an NFC terminal (client device) having an NFC function. Specifically, the object determination unit 121 determines whether a sensor signal indicated by the acquired signal information, is a sensor signal generated in a range larger than a predetermined range. As described above, when the sensor signal is generated in the range larger than the predetermined range, a probability is high that the above-mentioned object is an NFC terminal. On the other hand, when the sensor signal is generated in a range equal to or smaller than the predetermined range, a probability is high that the above-mentioned object is an indicator. The object determination unit 121 outputs a determination result to the touch information generation unit 122.

Note that, it is sufficient that the object determination unit 121 is capable of determining whether the object coming into contact with the touch panel 111 is an indicator or an NFC terminal. The constitution is not limited such that it is determined whether or not the sensor signal indicated by the signal information acquired is a sensor signal generated in a range larger than the predetermined range as described above. For example, a constitution may be such that it is determined whether the number of acquired sensor signals is higher than a predetermined number. In this case, when the number is higher than the predetermined number, a possibility is high that the above-mentioned object is an NFC terminal. On the other hand, when the number is lower than the predetermined number, a possibility is high that the above-mentioned object is an indicator.

The touch information generation unit 122 generates touch information in accordance with the determination result from the object determination unit 121. Upon the acquired determination result indicating that the sensor signal is not generated in the range larger than the predetermined range, the touch information generation unit 122 generates touch information by specifying a coordinate on which the strongest sensor signal is generated (peak coordinate) and associating the coordinate and a touch ID identifying the touch information.

On the other hand, upon the acquired determination result indicating that the sensor signal is generated in the range larger than the predetermined range, the touch information generation unit 122 performs a shape analysis of the sensor signal by referring to the signal information.

Figures 4A, 4B:
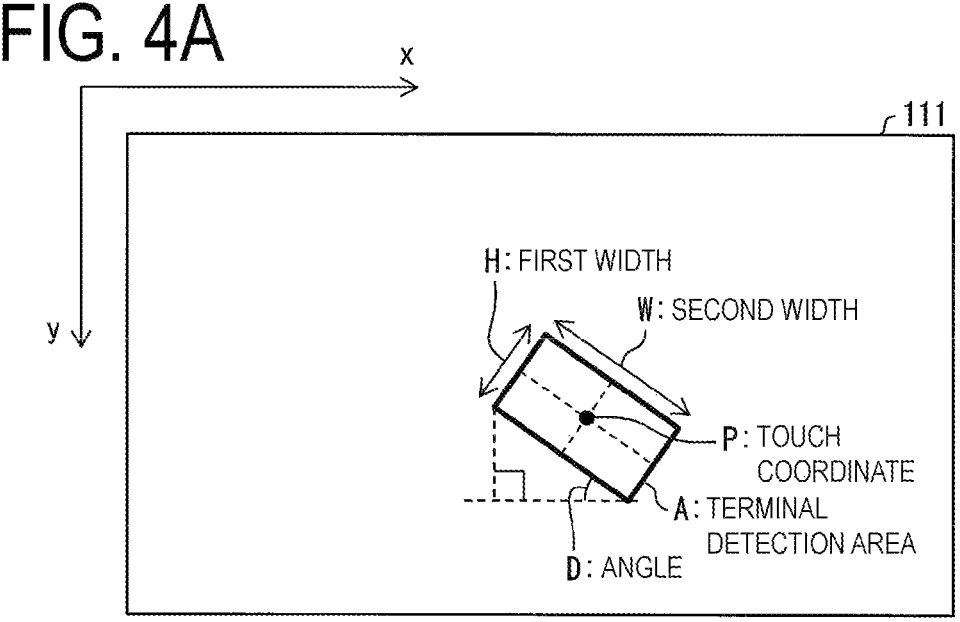
FIG. 4A is a diagram illustrating one example of each parameter of a terminal candidate area specified by shape analysis.
FIG. 4B is illustrates a specific example of touch information in a case when the object is a rectangular NFC terminal.

Here, details of the shape analysis and the touch information will be described with reference to FIGS. 4A and 4B. FIG. 4A is a diagram illustrating an example of each parameter of a terminal candidate area specified by the shape analysis. Furthermore, FIG. 4B illustrates a specific example of touch information in a case when the object is a rectangular NFC terminal. Note that, a virtual XY-plane, such as illustrated in FIG. 4A, is configured in advance on the touch panel 111. The touch information generation unit 122 specifies the terminal candidate area from a coordinate where the sensor signal is generated. Subsequently, by correcting the outer edge of the terminal candidate area, the touch information generation unit 122 forms a circumference shape (contour) of the terminal candidate area, as illustrated in FIG. 4A. Then, the touch information generation unit 122 specifies the circumference shape illustrated in FIG. 4A (in the case of FIG. 4A, specifies that the circumference shape is rectangular) and calculates a center coordinate (position information, hereinafter, touch coordinate), a size, and a slant angle (angle information, hereinafter, angle) of the rectangle. Note that, the "angle" is formed by the X-axis of the above-mentioned XY-plane (first axis), and an axis being on the same plane as the above-mentioned X-axis and being specified on the basis of the circumference shape of the terminal candidate area (second axis; in the example of FIGS. 4A and 4B, a long side of the rectangle).

Note that, the circumference shape of the terminal candidate area may be formed with reference to information on the shape and size of the NFC terminal and the antenna coil, acquired from the NFC terminal via the NFC antenna 114.

Afterwards, the touch information generation unit 122 generates the touch information illustrated in FIG. 4B, by associating, with a touch ID, the calculated touch coordinate, size, angle, and a shape code indicating circumference shape of the terminal candidate area. The touch information generation unit 122 outputs the generated touch information to a later-described association unit 211 (a terminal information acquisition unit, a position information acquisition unit, a size determination unit, a shape determination unit). Here, as illustrated in FIG. 4B, the shape code is a two-digit number associated with the circumference shape of the terminal candidate area. Data associating the circumference shape and the shape code is stored in advance in the storage unit 22, for example, as illustrated in FIG. 4B, a shape code "01" is associated with a rectangle. Moreover, as illustrated in the later-described FIG. 5B, a shape code "03" is associated with an ellipse. Note that, an association of the shape code and the shape is not limited to this example, a shape code "02" may be associated with a circle, and "04" may be associated with a triangle, for example. Furthermore, a combination (association) of the shape code and the shape, and a number of the shape code are not limited to the above-mentioned example. Note that, expressing the touch ID by information including an alphabet character and a number, and the shape code by a two-digit number in FIG. 4B, is one example that is not limiting. Moreover, the sizes illustrated in FIG. 4B are obtained when assuming an NFC terminal of rectangular circumference shape in which H indicates the length of a short side of the NFC terminal and W indicates the length of a long side of the NFC terminal; however, this example is not limiting.

Furthermore, a type of information included in the touch information illustrated in FIG. 4B is one example that is not limiting. For example, "status information" indicating a state of the NFC terminal on the NFC display 11, may be included. Here, specific examples of the "status information" can include a "touch in" indicating that the NFC terminal has come into contact with the NFC display 11, a "move" indicating that the NFC terminal is moving on the NFC display 11, and a "touch out" indicating that the NFC terminal leaves the NFC display 11; however, these examples are not limiting.

Here, each parameter and touch information of a terminal candidate area for a case in which the NFC terminal is not rectangular will be described with reference to FIGS. 5A and 5B. Here, a case in which the NFC terminal is of elliptical shape will be described. Note that, description of content that is the same as in FIGS. 4A and 4B will be omitted here.

Figures 5A, 5B:
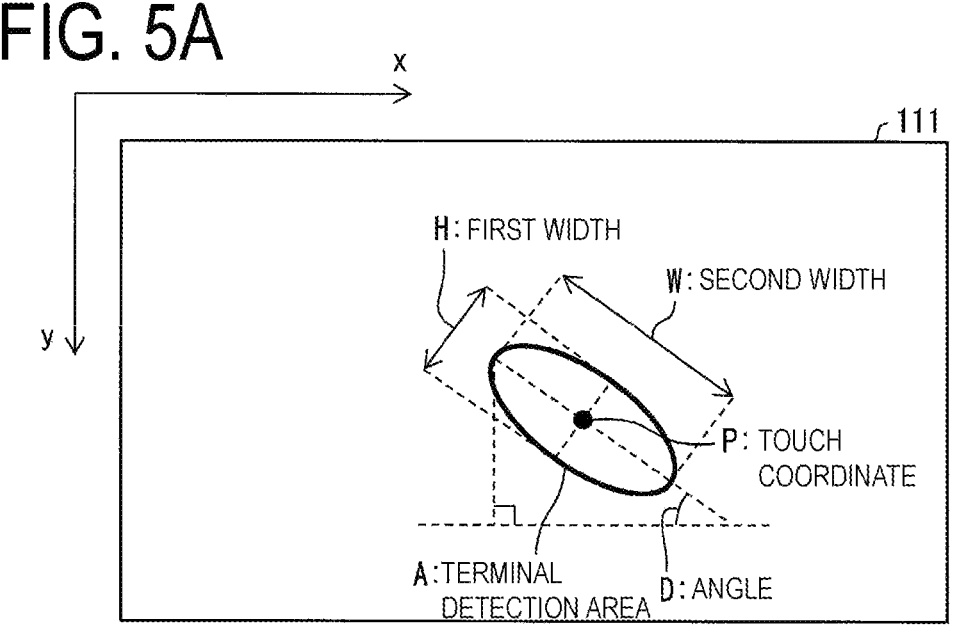
FIG. 5A is a diagram illustrating another example of each parameter of a terminal candidate area specified by shape analysis.
FIG. 5B illustrates a specific example of touch information in a case when an object is an elliptical NFC terminal.

In the case of this example, as a result of forming the circumference shape of the terminal candidate area as illustrated in FIG. 5A, the touch information generation unit 122 specifies the shape as an ellipse. Then, as illustrated in FIG. 5B, the shape code of the touch information is set to be "03".

Note that, as the sizes illustrated in FIG. 5B are obtained upon assuming an NFC terminal of elliptical circumference shape, H indicates the length of a minor axis of the NFC terminal and W indicates the length of a major axis of the NFC terminal. Furthermore, the "angle" in the example of FIG. 5 is formed by the X-axis of the above-mentioned XY-plane (first axis), and an axis being on the same plane as the above-mentioned X-axis and being specified on the basis of the circumference shape of the terminal candidate area (second axis; in the example of FIG. 5, the major axis of an ellipse).

Note that, when a contact of an object is continuous, the touch panel 111 continuously outputs signal information to the signal information processing unit 12. Based on the acquired signal information, the touch information generation unit 122 continuously generates touch information to be output to the later-described association unit 211. At this point, the touch information generation unit 122 assigns the same touch ID to the generated touch information until the output of signal information from the touch panel ceases. This process will be described with reference to FIGS. 6A and 6B. FIG. 6A is a diagram illustrating a specific example of touch information generated when the NFC terminal comes into contact with the touch panel 111. FIG. 6B illustrates a specific example of touch information when the NFC terminal moves while keeping the contact with the touch panel 111. Note that, here, an example in which the NFC terminal is of rectangular shape (see FIG. 4) will be described.

When the NFC terminal comes into contact with the touch panel 111, the touch information generation unit 122 generates the touch information illustrated in FIG. 6A by executing the process described above. Thereafter, when the NFC terminal moves while being in contact with the touch panel 111, the touch information generation unit 122 continuously generates touch information in accordance with the acquired signal information. During this time, the NFC terminal moves, and thus, the touch coordinate included in the touch information changes. For example, as illustrated in FIGS. 6A and 6B, the touch coordinates change from (X, Y)=(50, 50) to (X, Y)=(100, 80). Note that, actually, during the time since the touch information illustrated in FIG. 6A is generated until the touch information illustrated in FIG. 6B is generated, a plurality of pieces of touch information including a touch coordinate in accordance with a locus of movement, are generated; however, for the sake of simplicity of the figures, this is omitted in FIGS. 6A and 6B.

On the other hand, when the NFC terminal moves while being in contact with the touch panel 111, the touch information generation unit 122 assigns a touch ID of the newly generated touch information as the touch ID of the touch information generated when the NFC terminal comes into contact with the touch panel 111. Specifically, as illustrated in FIG. 6B, the touch ID is kept being T0001. Then, the touch information generation unit 122 outputs the generated touch information to the later-described association unit 211.

The NFC control unit 13 controls the NFC unit 112. Specifically, the NFC control unit 13 brings the NFC antenna 114 into a state of NFC being possible (active) or into a state of NFC being impossible (inactive), in accordance with an instruction from a later-described application execution unit 212. Furthermore, the NFC control unit 13 uses the information acquired by the NFC unit 112 to generate NFC information. Here, details of the NFC information will be described with reference to FIG. 7A. FIG. 7A is a diagram illustrating a specific example of the NFC information. Note that, in the present embodiment, an example is described in which the NFC terminal is a card including an NFC function.

The NFC unit 112 acquires, by Near field radio communication via the NFC antenna 114, various types of information (terminal information) from the card, that is, an NFC terminal ID identifying the NFC terminal, a terminal type indicating a type of the NFC terminal, and terminal data that is information specific to the NFC terminal. Note that, in the example described here, as the NFC terminal is a card, terminal data held by the card is information indicating a symbol and a number of the card. However, the terminal type and the terminal data are not limited to the example illustrated in FIG. 7A.

Upon the NFC terminal ID, the terminal type being acquired, and the terminal data from the NFC unit 112, the NFC control unit 13 specifies an antenna ID identifying the NFC antenna 114 that has acquired these pieces of information. Note that, as there is only one NFC antenna 114 in the embodiment, also only one antenna ID is sufficient. Then, by associating the information acquired from the NFC unit 112 with the antenna ID, the NFC information illustrated in FIG. 7A is generated. The NFC control unit 13 outputs the generated NFC information to the association unit 211. Note that, information including an alphabet character and a number for expressing the NFC terminal ID and the antenna ID in FIG. 7A, is one example, and is not limiting.

The control unit 21 controls by generally managing a function of the information processing device 1, especially, the control device 20. The control unit 21 includes the association unit 211, the application execution unit 212, and an image generation unit 213.

The association unit 211 associates the touch information acquired from the signal information processing unit 12 and the NFC information acquired from the NFC control unit 13 and stores a result of the association. Specifically, upon touch information being acquired from the signal information processing unit 12, the association unit 211 determines whether the touch information indicates a contact of the indicator or a contact of the NFC terminal (card). Specifically, the association unit 211 determines whether the touch information includes a size, an angle, and a shape code that are information specific to the touch information indicating a contact of the NFC terminal. Note that, the above-mentioned specific information is not limited to the above-mentioned example.

Here, upon determining that the touch information indicates a contact of the indicator, that is, upon determining that the above-mentioned specific information is not included in the touch information, the association unit 211 assumes that the contact indicated by the touch information is the contact by the indicator (finger touch) and performs a subsequent process. Specifically, the association unit 211 outputs the touch information to the application execution unit 212.

On the other hand, when the touch information indicates a contact with the NFC terminal, that is, upon determining that the above-mentioned specific information is included, the association unit 211 confirms whether the NFC information has been acquired from the NFC control unit 13. Here, upon the NFC information being acquired, the association unit 211 generates association data 221 by associating the acquired touch information and the NFC information, and stores the resulting data in the storage unit 22. Here, details of the association data 221 will be described with reference to FIG. 7B. FIG. 7B is illustrates a specific example of the association data 221. As illustrated in FIG. 7B, the association data 221 is obtained by adding the NFC information described with reference to FIG. 7A, to the touch information described with reference to FIG. 4B. Note that, here, description of the various types of information included in the association data 221 will be omitted, as description has been given above. The association unit 211 stores, in the storage unit 22, the association data 221 generated by adding the NFC information to the touch information. Furthermore, the association unit 211 outputs the generated association data 221 to the application execution unit 212.

On the other hand, when the NFC information is not acquired, the association unit 211 confirms the touch ID included in the acquired touch information to confirm whether the association data 221 including the touch ID is present among the association data 221 stored in the storage unit 22. When such association data 221 is present, a touch information portion included in the association data 221 is updated by a content of the acquired touch information. Thereby, the NFC information generated through the execution of NFC by the NFC terminal and the information processing device 1 is associated with touch information generated after the movement of the NFC terminal, and the resulting data is stored. Thus, the information processing device 1 can retain information indicating the latest position of the NFC terminal on the touch panel 111. Furthermore, the association unit 211 outputs the updated association data 221 to the application execution unit 212. Note that, a case in which there is no association data 221 including the touch ID included in the acquired touch information will be described in a modification of a third embodiment described later.

The application execution unit 212 executes various types of applications of the information processing device 1. Specifically, upon touch information indicating a contact with an indicator for starting an application being acquired, the application execution unit 212 executes, among the applications 222 stored in the storage unit 22, an application 222 in accordance with the acquired touch information. Then, the application execution unit 212 instructs the image generation unit 213 to generate an image. Furthermore, the application execution unit 212 instructs the NFC control unit 13 to activate or deactivate the NFC antenna 114. Note that, a specific example of the application 222 according to the present embodiment will be described later.

In accordance with the instruction from the application execution unit 212, the image generation unit 213 generates the image. The image generation unit 213 outputs the generated image to the display driving unit 23.

The storage unit 22 stores various types of data used by the information processing device 1. The storage unit 22 stores at least the association data 221, the application 222, and antenna position information 223. Note that, description of the association data 221 and the application 222 has already been given and thus, description will be omitted here.

The antenna position information 223 is information indicating a position of the NFC antenna 114 in the NFC unit 112, specifically, the antenna position information 223 is information associating an antenna ID identifying the NFC antenna 114 with information indicating a position of the NFC antenna 114. When the NFC antenna 114 is of rectangular shape, the information indicating a position of the NFC antenna 114 may be, for example, XY-plane coordinates of the uppermost left and the lowermost right point of the NFC antenna 114 when an uppermost left point of the NFC unit 112 is the point of origin; or may be XY-plane coordinates of a central point of the NFC antenna 114; however, these examples are not limiting. Note that, details of a constitution using the antenna position information 223 will be described in a second embodiment.

The display driving unit 23 controls the display unit 113. Specifically, the display driving unit 23 displays an image acquired from the image generation unit 213 on the display unit 113.

Figures 8A, 8B:
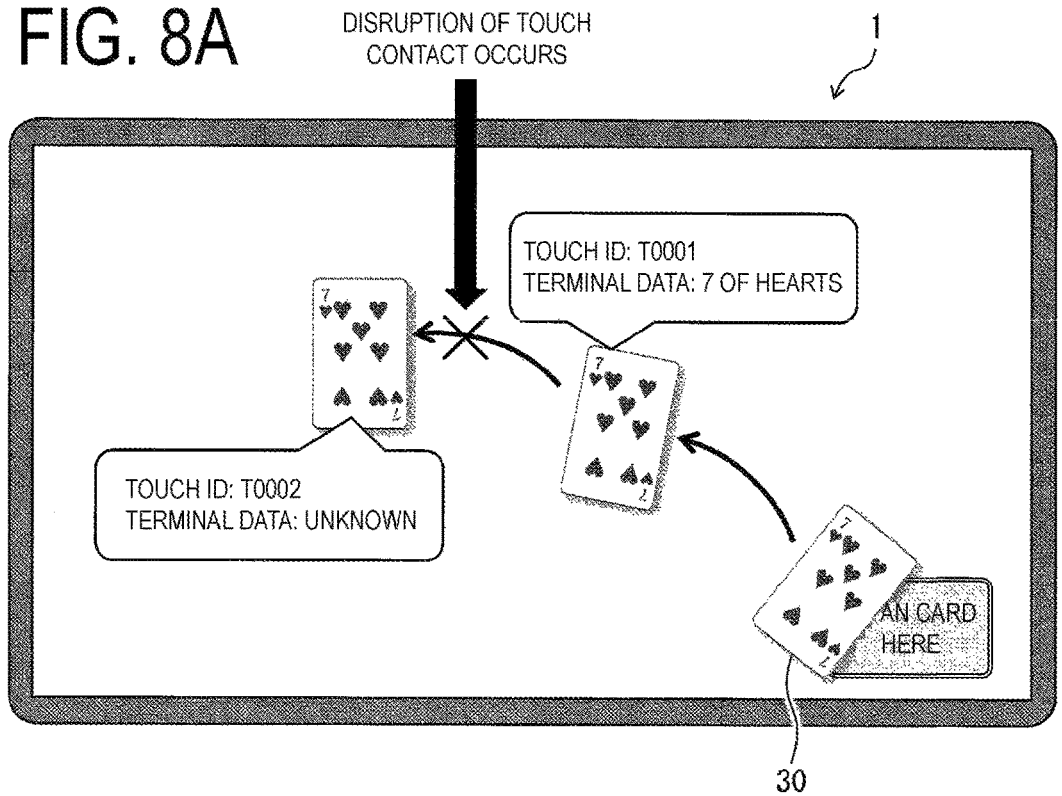
FIG. 8A is a schematic diagram illustrating deletion of association data due to an unintentional contact disruption.
FIG. 8B illustrates a specific example of association data when the NFC terminal is brought back into contact with the touch panel immediately after the contact disruption.

Prevention of Deletion of Association Data Due to Unintentional Contact Disruption Subsequently, prevention of deletion of association data due to an unintentional contact disruption will be described with reference to FIGS. 8A and 8B. FIG. 8A is a schematic diagram illustrating deletion of association data due to an unintentional contact disruption. FIG. 8B is a diagram illustrating a specific example of association data 221 when the NFC terminal is immediately brought back into contact with the touch panel 111 after a contact disruption.

Upon ceasing of the continuous signal information output from the touch panel, that is, when a contact between the NFC terminal and the touch panel 111 is disrupted, the signal information processing unit 12 outputs, to the association unit 211, contact disruption information indicating the disruption, and the touch ID indicating the contact. Upon reception of the contact disruption information and the touch ID, the association unit 211 deletes the association data 221 including the acquired touch ID from the storage unit 22.

Here, when the constitution is such that the association unit 211 deletes the association data 221 including the touch ID immediately after acquiring the contact disruption information and the touch ID, a problem as follows occurs. That is, as illustrated in FIG. 8A, after a user unintentionally releases the contact between the NFC terminal (card 30) and the touch panel 111 (after a disruption of touch contact occurs), the touch information indicates that the contact is not associated with the NFC information any more, even in a case that the card 30 and the touch panel 111 are brought again into contact. That is, the information processing device 1 is in a state of not having information about a 7 of hearts of the card 30. In this case, the user needs to bring the card 30 again into contact with the touch panel 111 at the position of the NFC antenna 114 to make the information processing device 1 acquire the terminal data of the card 30.

In view of this problem, the association unit 211 of the information processing device 1 according to the present embodiment starts a not illustrated timer upon acquiring the contact disruption information and the touch ID, and measures the time until touch information is again acquired. Then, when touch information is not again acquired until a predetermined time period has elapsed, the association unit 211 deletes the association data 221 including the acquired touch ID.

On the other hand, when touch information (second position information) is again acquired until the predetermined time period has elapsed, the association unit 211 temporarily stops the time measurement and compares the touch coordinate and size included in the touch information to the touch coordinate and size included in the association data 221 (the association data 221 including the touch ID acquired together with the contact disruption information) stored in the storage unit 22. When at least one of a difference of the two touch coordinates and a difference of the two sizes is not within a predetermined range, the association unit 211 restarts the time measurement.

On the other hand, when the difference of the two touch coordinates and the difference of the two sizes are within the predetermined range, the association unit 211 updates the touch information portion (first position information) of the association data 221 stored in the storage unit 22, by the newly acquired touch information.

As illustrated in FIG. 8B, the touch ID of the association data 221 after the update is different from the touch ID before the update. This is because, as illustrated in FIG. 8A, due to disrupting once a contact between the card 30 and the touch panel 111, the touch information generated upon re-establishing the contact includes a new touch ID (T0002).

As described above, even when the user unintentionally releases the contact between the NFC terminal and the touch panel 111, the association data 221 is not deleted when the contact between the NFC terminal and the touch panel 111 is re-established at approximately the same position within the predetermined time. Thus, as the user does not need to bring the card 30 again into contact with the touch panel 111 at the position of the NFC antenna 114, convenience for the user is improved.

Note that, here, a constitution is such that the touch coordinate and the size are compared; however, a constitution may be such that the association unit 211 only compares the touch coordinate. Furthermore, here, the size of the touch information is compared, that is, the lengths of the long side and of the short side of the facing surface of the NFC terminal facing the touch panel 111 are compared; however, an area of the facing surface may be calculated and compared. Moreover, a constitution may he such that only the long side of the facing surface is compared.

Furthermore, a constitution may he such that, in addition to the touch coordinate and the size, the shape code is compared. In this case, when the difference in the touch coordinate and the size of the acquired touch information and of the touch information included in the stored association data 221 is within the predetermined range, and when the two shape codes are the same, the association unit 211 updates the touch information portion (the first position information) of the association data 221 stored in the storage unit 22, by the newly acquired touch information. Note that, the constitution may be such that the touch information portion (the first position information) of the association data 221 stored in the storage unit 22 is updated by the newly acquired touch information, when the difference between the two touch coordinates is within the predetermined range and the two shape codes are the same.

Sequence of Process Executed by Information Processing Device 1

Figure 9:
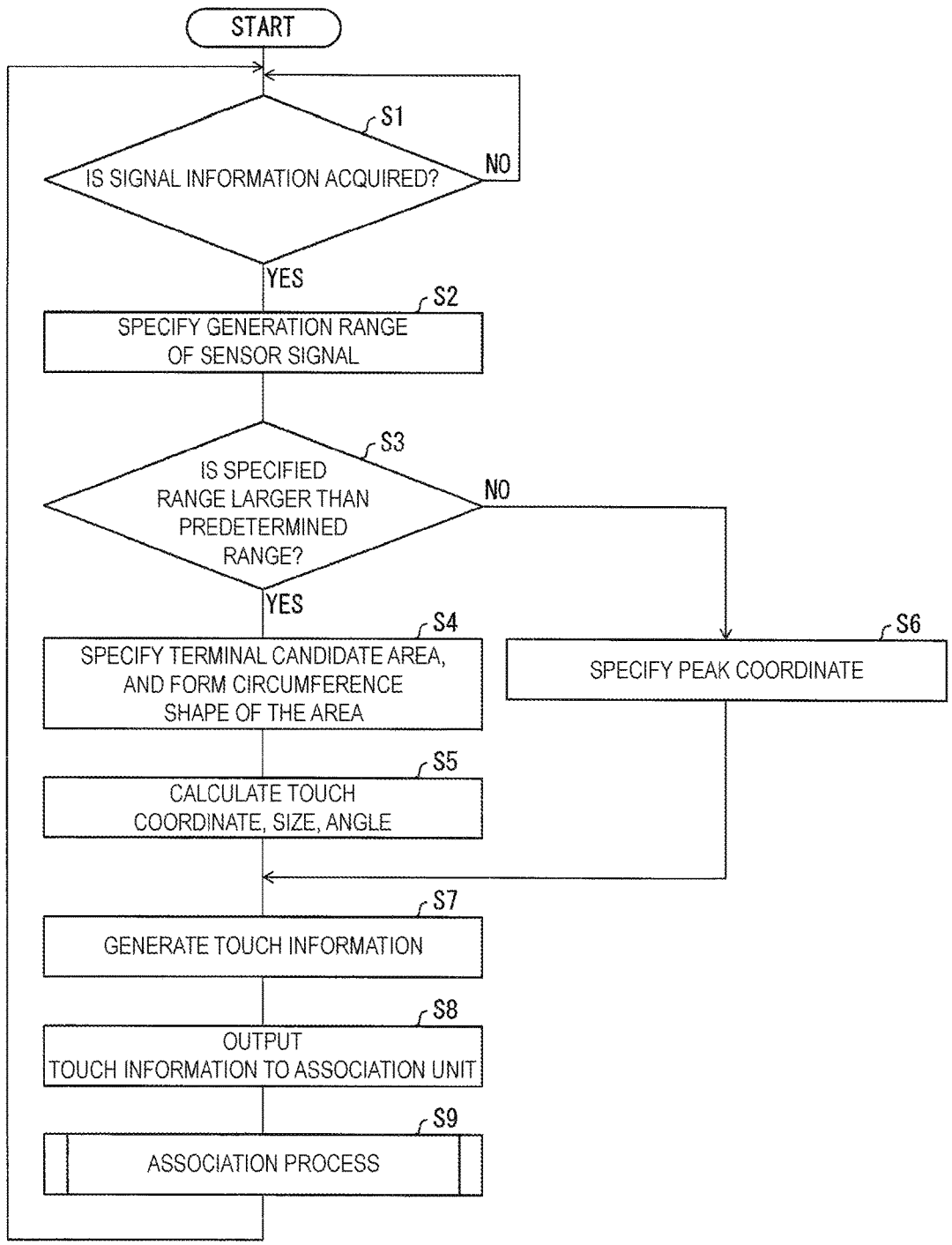
FIG. 9 is a flow chart illustrating one example for a sequence of a process executed by the information processing device illustrated in FIG. 1.

Next, a sequence of a process executed by the information processing device 1 will be described with reference to FIG. 9. FIG. 9 is a flow chart illustrating an example for the sequence of the process executed by the information processing device 1.

First, the signal information processing unit 12 awaits signal information output from the touch panel 111 (S1). Upon signal information being acquired (YES in S1), the object determination unit 121 uses the signal information to specify a generation range of the sensor signal (S2), and determines whether the generation range is larger than a predetermined range (S3). Then, the object determination unit 121 outputs the determination result to the touch information generation unit 122. When the generation range of the sensor signal is equal to or smaller than the predetermined range (NO in S3), the touch information generation unit 122 specifies the peak coordinate of the sensor signal (S6).

On the other hand, when the generation range of the sensor signal is larger than the predetermined range (YES in S3), the touch information generation unit 122 specifies the terminal candidate area and forms the circumference shape of the area (S4). Furthermore, the touch information generation unit 122 calculates the touch coordinate, size, and angle of the rectangle (S5).

Subsequently, the touch information generation unit 122 generates touch information (S7), and outputs the generated touch information to the association unit 211 (S8). Subsequently, the association unit 211 executes an association process (S9). Note that, details of the association process will be described later. Upon completion of the association process, the sequence returns to the process of step S1.

Sequence of Association Process

Figure 10:
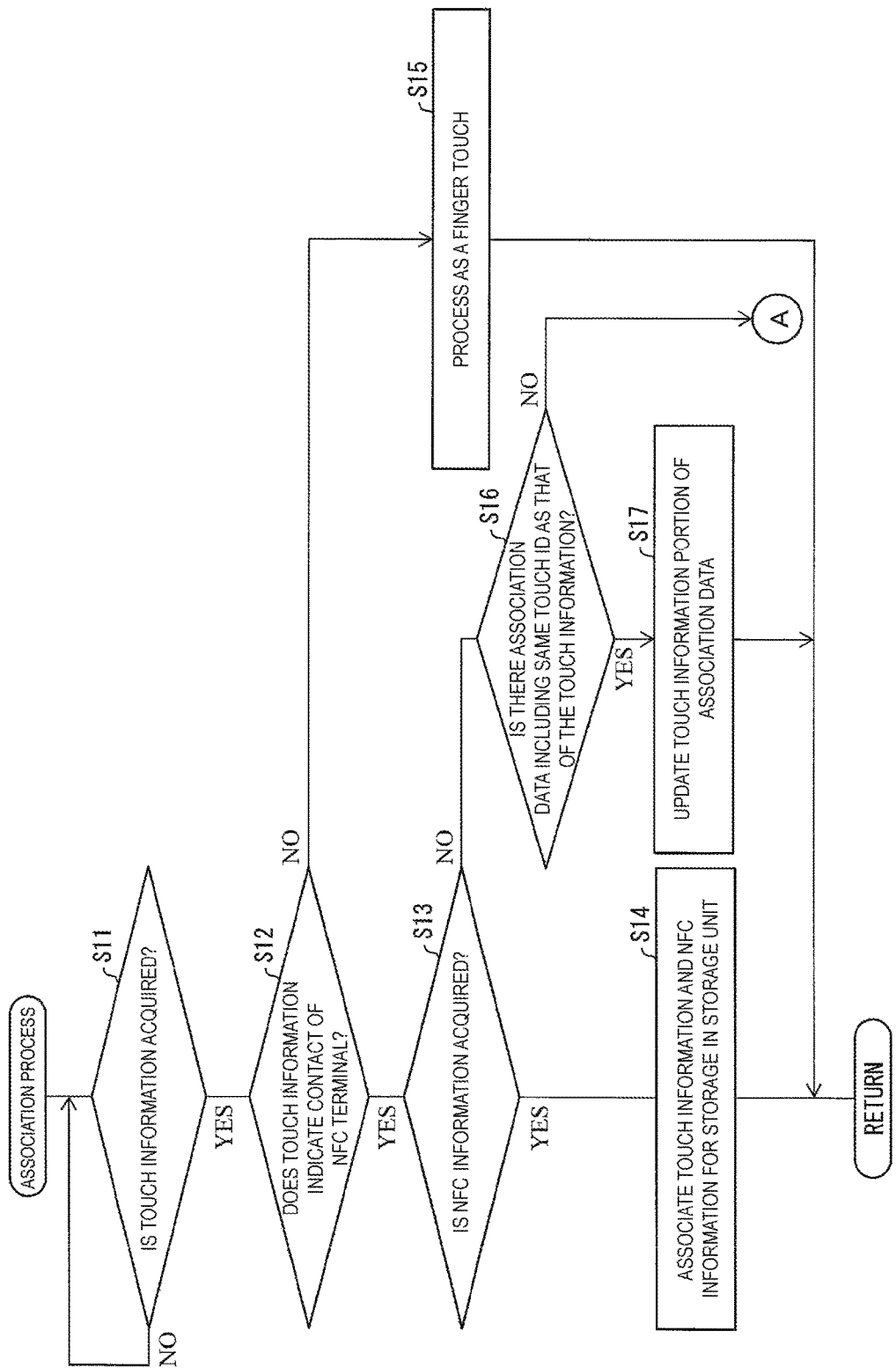
FIG. 10 is a flow chart illustrating one example for a sequence of an association process included in the flow chart of FIG. 9.

Next, a sequence of the association process included in the flow chart of FIG. 9 will be described with reference to FIG. 10. FIG. 10 is a flow chart illustrating an example for the sequence of the association process included in the flow chart of FIG. 9.

First, the association unit 211 is in a state of awaiting touch information (S11, position information acquisition step). Upon touch information being acquired (YES in S11), the association unit 211 determines whether the acquired touch information indicates a contact of the NFC terminal (S12). Specifically, the association unit 211 determines whether the touch information is the touch information illustrated in FIG. 4B, that is, whether the size, angle and shape code that are information specific to the touch information indicating the contact of the NFC terminal, are included in the touch information. When the touch information does not indicate the contact of the NFC terminal (NO in S12), the association unit 211 processes the contact indicated by the touch information as a finger touch (S15), and the association process is completed.

On the other hand, when the touch information indicates the contact of the NFC terminal (YES in S12), the association unit 211 confirms whether NFC information is acquired (S13, terminal information acquisition step). When NFC information is acquired (YES in S13), the association unit 211 associates the touch information and the NFC information and stores a result of the association in the storage unit 22 (S14, association step), upon which the association process is completed.

On the other hand , when the NFC information is not acquired (NO in S13), the association unit 211 confirms whether there is association data 221 including the same touch ID as in the acquired touch information (S16), and when there is such association data 221 (YES in S16), the association unit 211 updates the touch information portion of the association data 221 stored in the storage unit 22 (S17).

Thereby, the association process is completed. Note that, a process for a case in which there is no association data 221 including the same touch ID as that of the acquired touch information (NO in S16), will be described in the modification of the third embodiment described later.

Note that, in FIG. 10, the association unit 211 confirms whether the NFC information is acquired in step S13; however, a constitution may be such that the association unit 211 determines whether the touch coordinate included in the touch information corresponds to the position of the NFC antenna 114.

Example of Application

Figure 11:
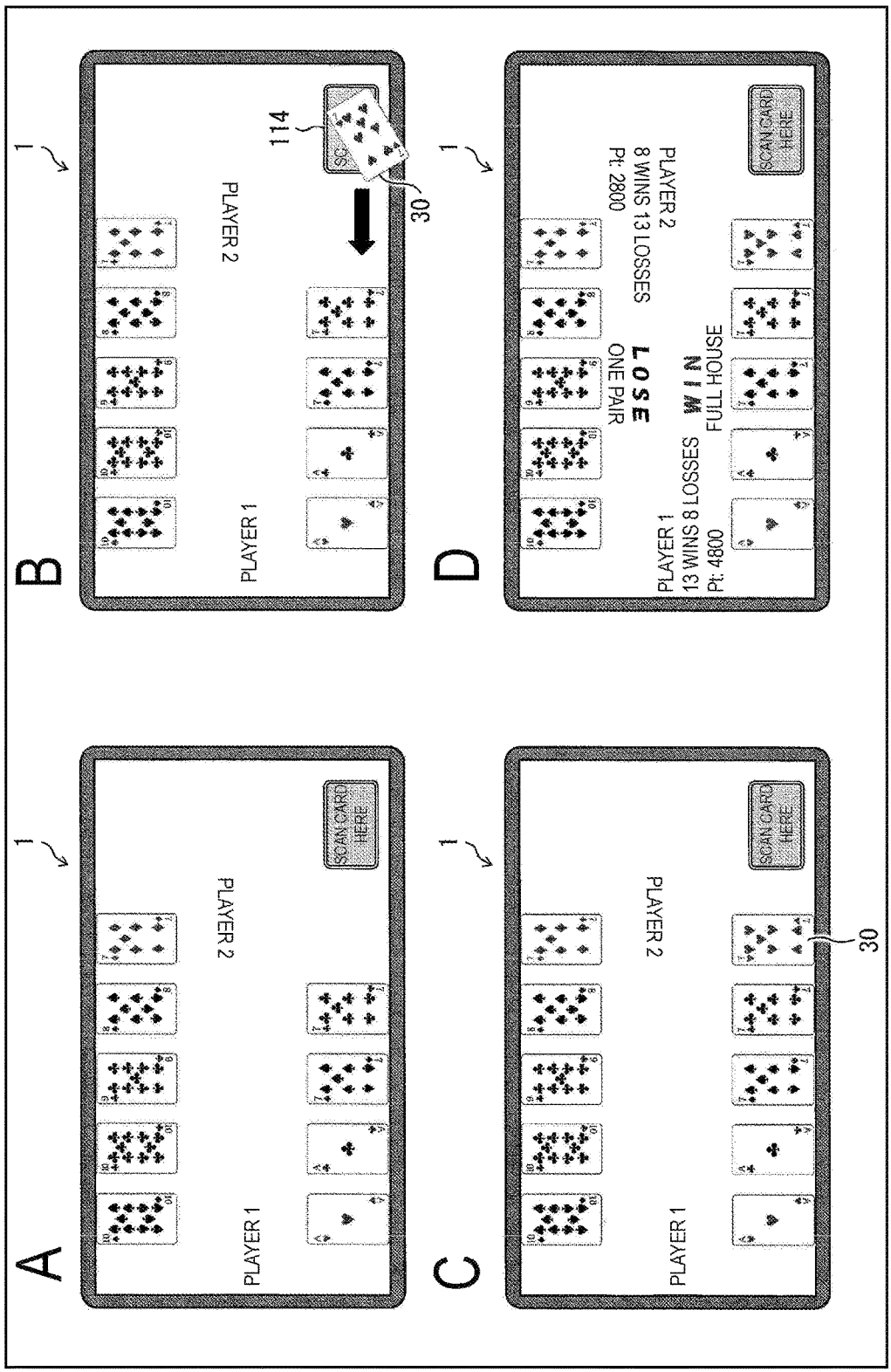
FIG. 11 is a transition diagram of a state in which the information processing device illustrated in FIG. 1 executes an application.

Next, an example of the application 222 executed by the information processing device 1 according to the present embodiment will be described with reference to FIG. 11 FIG. 11 is a transition diagram of a state in which the information processing device 1 according to the present embodiment executes the application 222. Note that, here, the information processing device 1 is placed flatly like a table, and description proceeds on the assumption that the NFC display 11 corresponds to a tabletop. Furthermore, among items illustrated in the rectangle (the NFC display 11 of the information processing device 1) in FIG. 11, a card corresponds to the NFC terminal placed on the NFC display 11, and another item is an image displayed by the NFC display 11.

The application 222 illustrated in FIG. 11 is an application for performing a poker game by two persons. Note that, this application 222 is one example, and the application executed by the information processing device 1 according to the present embodiment is not limited to this example.

A of FIG. 11 illustrates a state in which the process described here has already been executed by nine cards 30. Note that, in FIG. 11, the side bearing the numbers and symbols of the card 30 is on top, whereas in playing a poker game, this side may be on bottom. Furthermore, even though not illustrated, it is assumed that two users are each in the vicinity of the upper side and the lower side of the information processing device 1 illustrated in A in FIG. 11.

As illustrated in B of FIG. 11, a user who is a player 1 draws one card 30 from a not illustrated stack of cards 30, and brings the card 30 into contact with the NFC antenna 114. As the card 30 incorporates an NFC tag, information held by the card 30, that is, the NFC terminal ID, the terminal type, and the terminal data (symbols and numbers of the card, in the example of B of FIG. 11: 7 of hearts) is transmitted to the information processing device 1 upon contact with the NFC antenna 114.

Note that, the display driving unit 23 displays, in an area of the display unit 113 corresponding to the position of the NFC antenna 114, a guiding image for indicating, to the user, a position for approaching the card 30 (the position of the NFC antenna 114). Therefore, the user can easily identify the position for approaching the card 30.

The association unit 211 associates touch information of the card 30 at the position of the NFC antenna 114 and NFC information including the above-mentioned information transmitted from the card 30, and, together with storing the resulting information as the association data 221 in the storage unit 22, outputs the association data 221 to the application execution unit 212.

Next, as illustrated in B and C of FIG. 11, in a state in which the card 30 is in contact with the touch panel 111, the user moves the card 30 to a predetermined position. Due to this movement, the association unit 211 updates the touch information portion of the association data 221 of the card 30 stored in the storage unit 22. Furthermore, each time the association data 221 is updated, the association unit 211 outputs the updated association data 221 to the application execution unit 212. Then, as illustrated in C of FIG. 11, upon the card 30 reaching the predetermined position, the application execution unit 212 refers to the storage unit 22 to retrieve all association data 221. Afterwards, the application execution unit 212 classifies the retrieved association data 221 into association data 221 of the player 1 and association data 221 of the player 2, in accordance with the touch coordinate included in the association data 221.

Subsequently, the application execution unit 212 refers to the terminal data included in the association data 221 after classification to specify a poker hand, and, based on the poker hand, specifies a winner/loser of the game, a cumulative game result, and cumulative points. Then, the application execution unit 212 instructs the image generation unit 213 to display each of the specified data as an image.

Note that, for the application execution unit 212 of the present embodiment, the card 30 reaching the predetermined position is a trigger to execute the process; however, this example is not limiting. For example, a trigger may also be all 10 cards being arranged or a trigger may also be a reception of a predetermined user operation.

Upon receiving the instruction from the application execution unit 212, the image generation unit 213 generates an image and outputs the image to the display driving unit 23. As illustrated in D of FIG. 11, the display driving unit 23 displays the acquired image on the display unit 113. Thereby, one poker game of the application 222 is completed.

That is, each time the two players draw one card 30 from the stack of cards, the two players bring the drawn card 30 into contact with the position of the NFC antenna 14. Then, the two players move the card 30 to the predetermined position while keeping the contact. Afterwards, upon placing five cards 30 each on the predetermined position, a poker hand, a winner/loser of the game, and the like, are displayed on the display unit 113. Note that, this sequence is one example, and the sequence of the poker game executed by the application 222 is not limited to this example.

Second Embodiment

Description of another embodiment of the present invention is given below, based on FIG. 12 and FIG. 13. Note that, for simplicity, components illustrated in the above-described embodiment are designated by the same reference numerals as those having the same function, and description thereof is omitted as appropriate.

Figure 12:
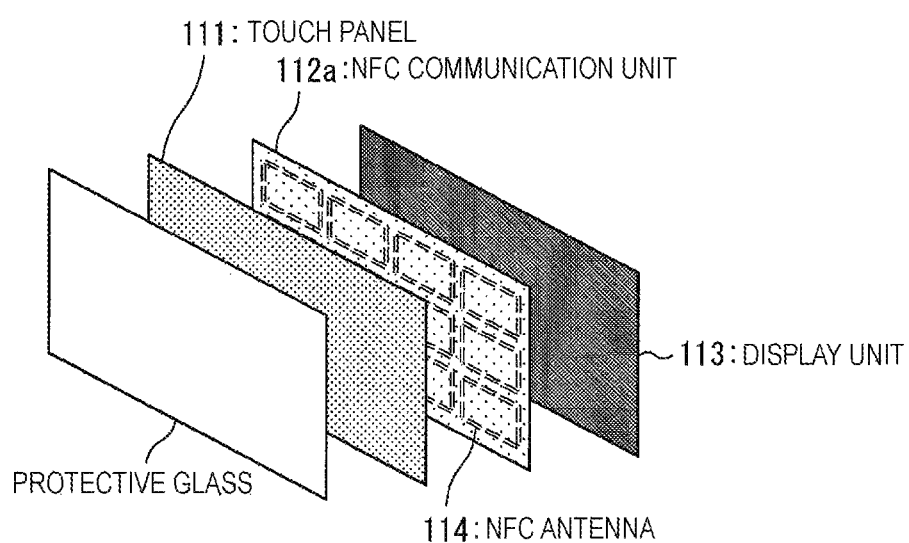
FIG. 12 is diagram illustrating a detailed constitution of an NFC display included in an information processing device according to a second embodiment.

FIG. 12 is diagram illustrating a detailed constitution of an NFC display 11a included in an information processing device 1a according to the present embodiment. Unlike the NFC display 11 described in the first embodiment, the NFC display 11a includes an NFC unit 112a. Unlike the NFC unit 112 described in the first embodiment, the NFC unit 112a includes a plurality of NFC antennas 114. Note that, the plurality of NFC antennas 114 are arranged in a matrix in the NFC unit 112a illustrated in FIG. 12; however, the number and arrangement of the NFC antennas 114 are not limited to the example of FIG. 12. Note that, a different antenna ID is configured for each of the plurality of NFC antennas 114 according to the present embodiment.

Note that, except for including the NFC display 11a instead of the NFC display 11, the information processing device 1a is identical to the information processing device 1 described in the first embodiment. Thus, description of a block diagram illustrating a constitution of the main parts of the information processing device 1a, as well as description of each component is omitted in the present embodiment.

Example of Application

Next, an example of the application 222a executed by the information processing device 1a according to the present embodiment will be described with reference to FIG. 13. FIG. 13 is a transition diagram of a state in which the information processing device 1a according to the present embodiment executes the application 222a. Furthermore, among items illustrated in the rectangle (the NFC display 11a of the information processing device 1a) in FIG. 13, a card corresponds to the NFC terminal placed on the NFC display 11, and another item is an image displayed by the NFC display 11.

Figure 13:
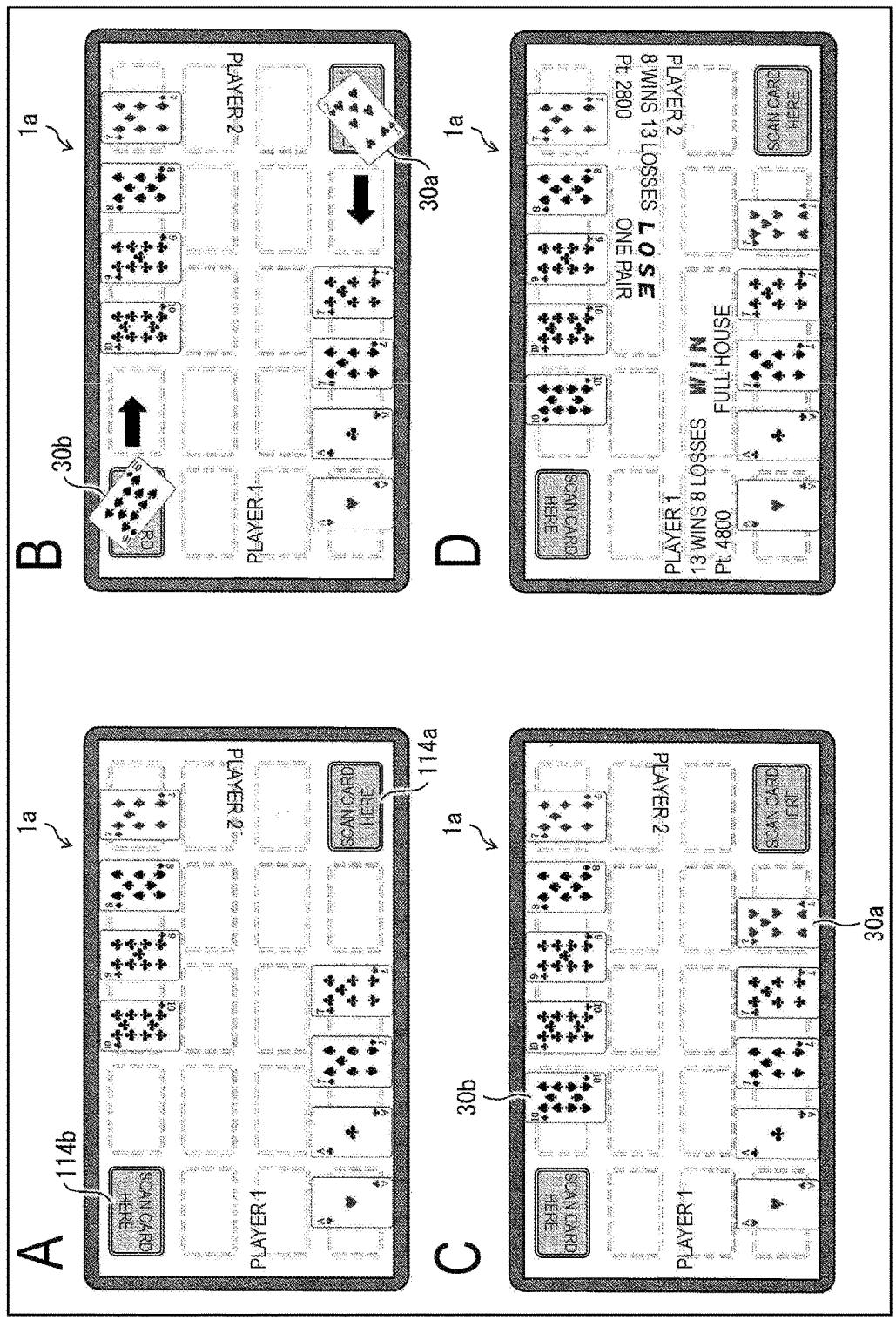
FIG. 13 is a transition diagram of a state in which the information processing device according to the second embodiment executes an application.

Similar to the application 222 described in the first embodiment, the application 222a illustrated in FIG. 13 is an application for performing a poker game by two people. Therefore, description of content identical to the application 222 described in the first embodiment will be omitted here. Furthermore, this application 222a is one example, and the application executed by the information processing device 1a according to the present embodiment is not limited to this example.

As described above, a plurality of NFC antennas 114 are arranged in a matrix in the information processing device 1a according to the present embodiment. Upon receiving an instruction from the application execution unit 212, the NFC control unit 13 activates, among the plurality of NFC antennas 114, an NFC antenna 114a and an NFC antenna 114b illustrated in A of FIG. 13. Then, as illustrated in A of FIG. 13, the display driving unit 23 displays, at the position of the activated NFC antenna 114a and NFC antenna 114b, a guiding image for indicating, to the user, a position to be approached by the card 30 (the position of the NFC antenna 114). That is, the information processing device 1a activates an NFC antenna 114 positioned in the vicinity of the user. Thereby, each user can perform NFC with an NFC antenna 114 in a position where the card 30 can easily be approached.

Subsequently, as illustrated in B of FIG. 13, a user who is a player 1 and a user who is a player 2 each draw one card 30 from a not illustrated stack of the cards 30, and bring each of the cards 30 (a card 30a and a card 30b) in contact with the NFC antenna 114b and the NFC antenna 114a. Thus, information held by each of the cards 30 is transmitted to the information processing device 1a.

Then, the NFC control unit 13 generates NFC information by associating each an antenna ID indicating the NFC antenna 114a and the NFC antenna 114b to the information received from the card 30a and the card 30b. The NFC control unit 13 outputs the generated NFC information to the association unit 211.

Upon the touch information and the NFC information being acquired, the association unit 211 first uses the antenna ID included in the NFC information to specify the position of the NFC antenna 114 from the antenna position information 223. Afterwards, the association unit 211 specifies a combination of the associating touch information and the NFC information, from the specified position and the touch coordinate included in the touch information. Specifically, the association unit 211 associates touch information in which the touch coordinate is within a predetermined range for the specified position, and NFC information including an antenna ID associated with the specified position. That is, the association unit 211 associates touch information at the position of the NFC antenna 114a (touch information of the card 30a) and NFC information including the antenna ID of the NFC antenna 114a, and stores the resulting information as association data 221a in the storage unit 22. Furthermore, the association unit 211 associates touch information at the position of the NFC antenna 114b (touch information of the card 30b) and NFC information including the antenna ID of the NFC antenna 114b, and stores the resulting information as association data 221b in the storage unit 22. In other words, when a plurality of cards 30 simultaneously perform Near field radio communication, the association unit 211 associates NFC information including information acquired by an NFC antenna 114 that, among NFC antennas 114 performing Near field radio communication, is closest to a position at which a card 30 comes into contact with or approaches, and touch information of a card 30 closest to the NFC antenna 114. Moreover, the association unit 211 outputs the association data 221a and the association data 221b to the application execution unit 212.

Next, as illustrated in B and C of FIG. 13, two users each move the card 30a and the card 30b to a predetermined position while keeping the contact with the NFC display 11a (the touch panel 111). Due to this movement, the association unit 221 updates the touch information portion of the association data 221a of the card 30a and of the association data 221b of the card 30b stored in the storage unit 22. Furthermore, each time the association data 221a and the association data 221b are updated, the association unit 211 outputs the updated association data 221 to the application execution unit 212. Then, as illustrated in C of FIG. 13, upon the card 30a and the card 30b reaching the predetermined position, the application execution unit 212 refers to the storage unit 22 to retrieve all association data 221. Thereafter, the application execution unit 212 classifies the retrieved association data 221 into association data 221 of the player 1 and association data 221 of the player 2, in accordance with the antenna ID included in the association data 221. Moreover, as described in the first embodiment, the application execution unit 212 may classify the retrieved association data 221 into association data 221 of the player 1 and association data 221 of the player 2, in accordance with the touch coordinate included in the association data 221. The following process is identical to the content described in the first embodiment and thus, description thereof is omitted here.

As described above, the information processing device 1a according to the present embodiment has a plurality of NFC antennas 114. Thus, it is possible to select a layout of the application 222a and an NIT antenna 114 that activates in accordance with a position that is convenient for the user. Furthermore, as an antenna ID is included in the association data 221, when a different NFC antenna 114 is used for the application 222a (such as the above-mentioned poker game application) depending on a user, it is possible to use the antenna ID to specify the user.

Note that, in the above-described application example, only the NFC antenna 114a and the NFC antenna 114b are activated, however, all NFC antennas 114 adjacent to the upper side and the lower side of the NFC display 11 in FIG. 13 may be activated. Thereby, it is possible to perform NFC at the position at which the card 30 is placed after the movement and it is possible to acquire the terminal data of each card 30 more precisely.

Third Embodiment

Still another embodiment of the present invention will be described below, based on FIGS. 14 to 16. Note that, for simplicity, components illustrated in the above-described embodiments are designated by the same reference numerals as those having the same function, and description thereof is omitted as appropriate.

In the first and second embodiment, a constitution was described in which, after performing NFC between the NFC terminal (the card 30) and the information processing device 1 (or the information processing device 1a), the application execution unit 212 executes the process in accordance with the movement of the NFC terminal. In the present embodiment, on the other hand, a constitution is described in which the application execution unit 212 executes a process in accordance with a change in the angle of the NFC terminal. Note that, an information processing device according to the present embodiment is the information processing device 1a described in the second embodiment and thus, description thereof is omitted here.

Example of Application

An example of an application 222b executed by the information processing device 1a according to the present embodiment will be described with reference to FIG. 14. FIG. 14 is a transition diagram of a state in which the information processing device 1a according to the present embodiment executes the application 222b. Furthermore, among items illustrated in the rectangle (the NFC display 11a of the information processing device 1a) in FIG. 14, a card corresponds to the NFC terminal placed on the NFC display 11, and another item is an image displayed by the NFC display 11.

Figure 14:
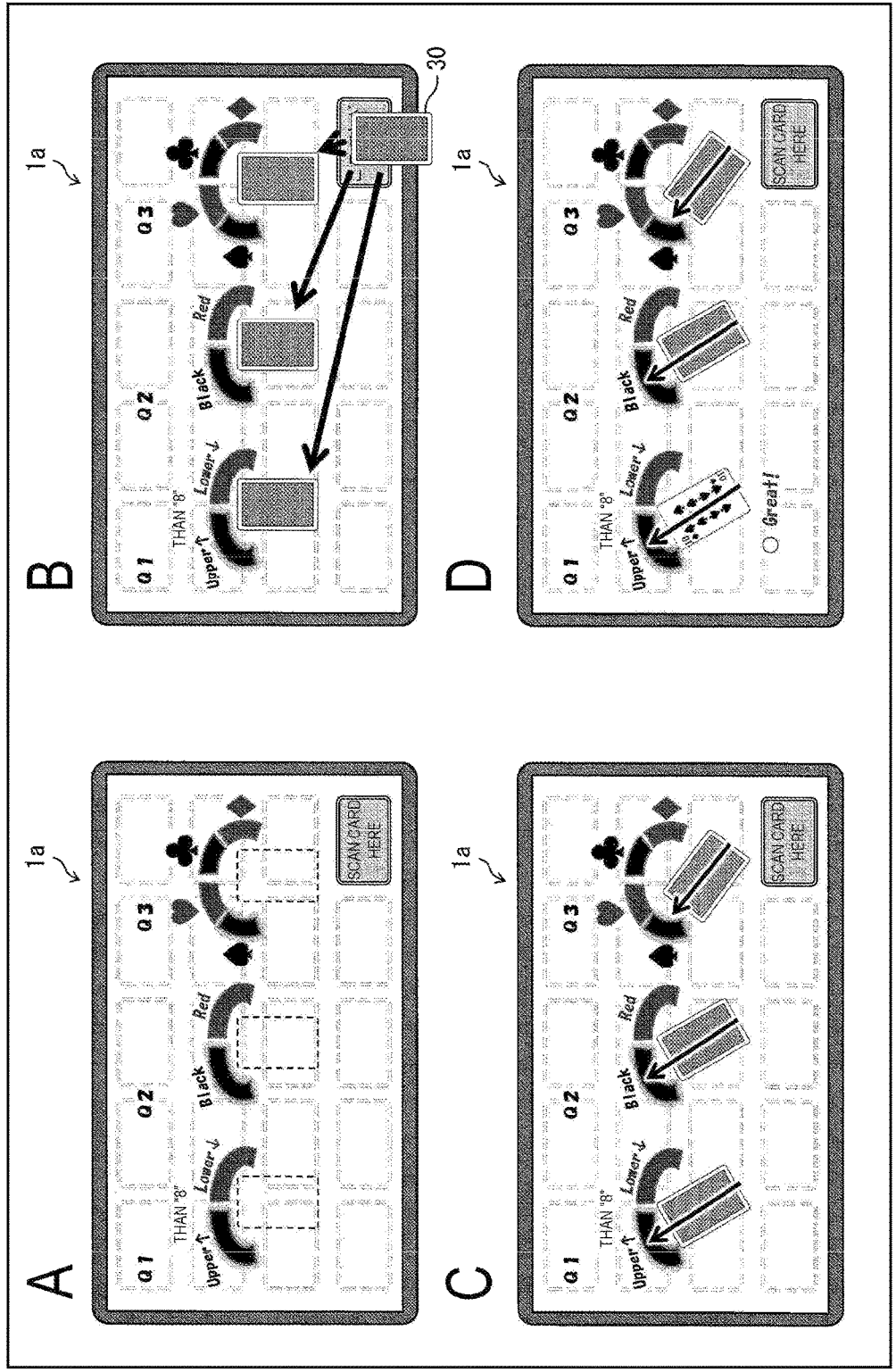
FIG. 14 is a transition diagram of a state in which an information processing device according to a third embodiment executes an application.

The application 222b illustrated in FIG. 14 is an application for performing a game using cards. Note that, this application 222b is one example, and the application executed by the information processing device 1a according to the present embodiment is not limited to this example.

The application execution unit 212 executes the above-mentioned application 222b and instructs the image generation unit 213 to generate an image. The image generation unit 213 generates the image in accordance with the instruction and outputs the generated image to the display driving unit 23. The display driving unit 23 displays the acquired image on the display unit 113. Thus, as illustrated in A of FIG. 14, images illustrating three questions are displayed on the display unit 113. Furthermore, the images illustrating each question include a guiding image (dashed lines in A of FIG. 14) indicating a position where the cards are to be placed. Thereby, it is possible to help the user place the card on the guiding image. Note that, the guiding image is not limited to an image of dashed lines. For example, an image of a card may also be displayed.

Subsequently, the user draws three cards from a not illustrated stack of the cards 30 and, after bringing each card into contact with an active NFC antenna 114 (the NFC antenna 114 at the position where the guiding image is displayed), moves each card 30 to a predetermined position while keeping the contact, as illustrated in B of FIG. 14.

Each of the three questions is: a question for predicting whether the number of the card 30 is higher or lower than 8, a question for predicting whether the color of the card 30 is black or red, and a question for predicting the symbol of the card 30. As illustrated in C of FIG. 14, the user gives an answer to each question by tilting (changing the angle of) each card 30. Taking Q1 as an example, the user has answered that the number of the card 30 is higher than 8 by changing the angle of the card 30. Note that, description is given on the assumption that the "angle" in the present embodiment is formed by the X-axis of an XY-plane configured on the touch panel 111 (first axis), and an axis on the same plane as the above-mentioned X-axis, specified on the basis of the circumference shape of the terminal candidate area (second axis; in the example of FIG. 14, a long side of the rectangle that is the circumference shape of the card 30). However, the angle is not limited to this example.

When the user tilts the card 30, the touch information generation unit 122 generates touch information including an angle of the card 30 after tilting and outputs the touch information to the association unit 211. The association unit 211 updates, by the acquired touch information, the touch information portion of the association data 221 that has the same touch ID as that of the acquired touch information. Furthermore, the association unit 211 outputs the updated association data 221 to the application execution unit 212.

Here, an answer database associating each answer with a range of the angle of the card (not illustrated) is stored in the storage unit 22. Upon description with taking the Q1 illustrated in FIG. 14 as example, the information "higher than the displayed number" is associated with the information "0 to 80°", and the information "lower than the displayed number" is associated with the information "100 to 180°". The application execution unit 212 identifies an answer from the user by referring to the angle included in the acquired association data 221 and to the answer database. Furthermore, the application execution unit 212 identifies a correct answer to the question by referring to the terminal data included in the acquired association data 221. Then, the application execution unit 212 determines whether the answer from the user is correct by comparing the identified answer from the user to the correct answer, and outputs, to the image generation unit 213, a generation instruction of an image, based on the determination result.

The image generation unit 213 generates the image in accordance with the instruction and outputs the generated image to the display driving unit 23. Then, the display driving unit 23 displays the image generated by the image generation unit 213 on the display unit 113. Thereby, as illustrated in D of FIG. 14, an image illustrating whether the answer from the user is correct, is displayed on the display unit 113. In the case of the example in D of FIG. 14, as the number of the card 30 is 10, the image "○ Great!" indicating that the answer from the user is correct, is displayed on the display unit 113.

As described above, by the information processing device 1a according to the present embodiment, it is possible to perform a process in accordance with the change in the angle of the NFC terminal. Thus, by using the change in the angle of the NFC terminal (in other words, an operation rotating the NFC terminal), an intuitive operation is possible.

Modification of Third Embodiment

In the above-described example, a constitution was described in which, after NFC is performed between the card 30 and the information processing device 1a, the card 30 is moved to the predetermined position. However, the present embodiment is not limited to this constitution. Specifically, NFC may be performed between the card 30 and the information processing device 1a, ager the card 30 is placed on the predetermined position first and the angle of the card 30 is changed (that is, after the user answers).

Figure 15:
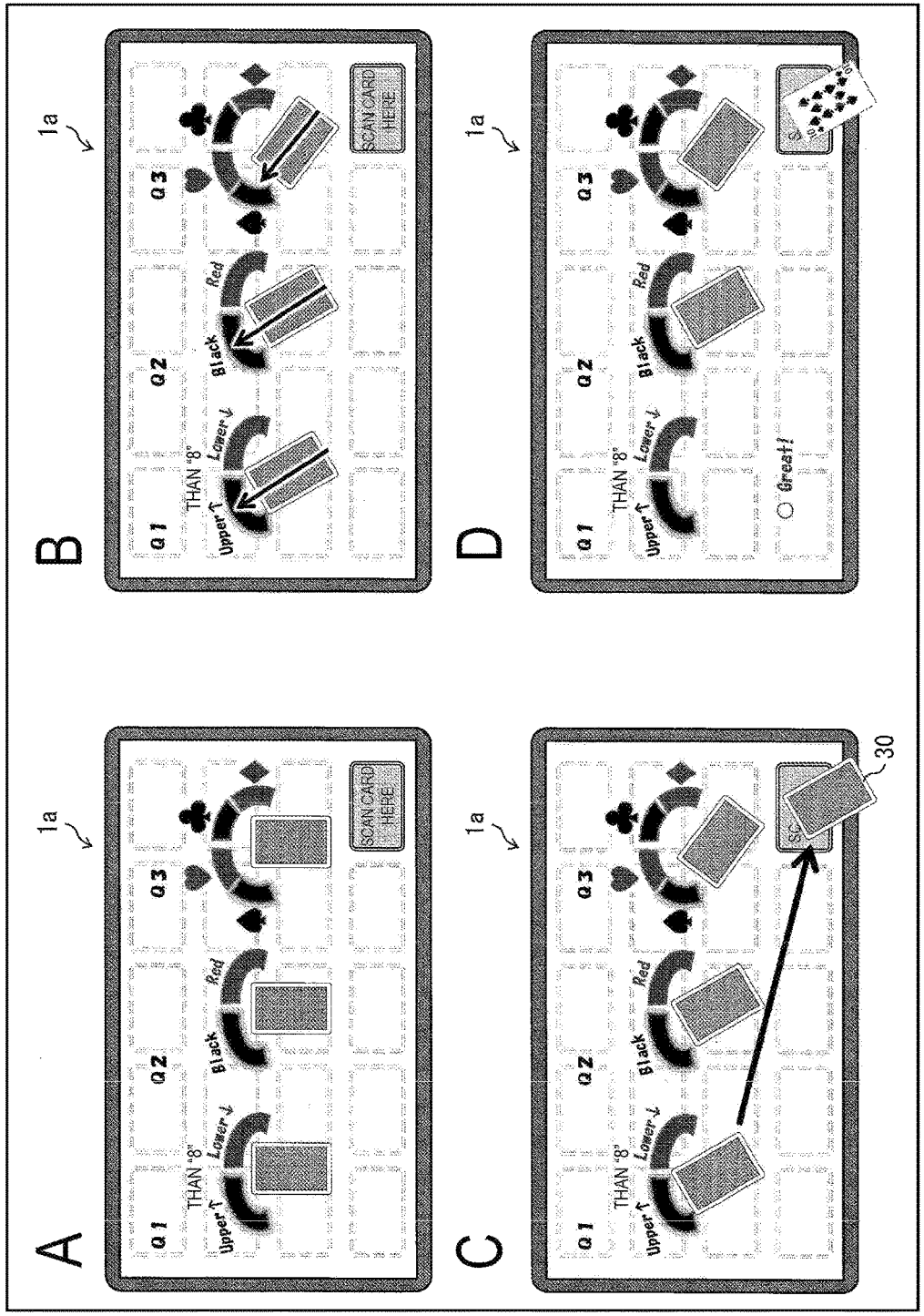
FIG. 15 is a transition diagram of a state in which an information processing device according to a modification of the third embodiment executes an application.

FIG. 15 is a transition diagram of a state in which the information processing device 1a according to the present modification executes an application 222c to be executed. Note that, similarly to the above-described application 222b, the application 222c illustrated in FIG. 15 is an application for performing a game using cards, and thus, description of content that is the same as for the application 222b is omitted. Furthermore, among items illustrated in the rectangle (the NFC display 11a of the information processing device 1a) in FIG. 15, a card corresponds to the NFC terminal placed on the NFC display 11, and another item is an image displayed by the NFC display 11.

First, a user draws three cards from a not illustrated stack of the cards 30 and places each card on a predetermined position, as illustrated in A of FIG. 15. Thereby, the touch information generation unit 122 generates touch information and outputs the generated touch information to the association unit 211. Note that, the image displayed on the NFC display 11 before the cards are arranged is identical to the one in A of FIG. 14, and thus, this image is omitted in FIG. 15. That is, in the present modification, the images illustrating each question also include the guiding image (dashed lines in A of FIG. 14) indicating the position where the cards are to be placed.

Here, the association unit 211 determines whether the NFC information is acquired. In this case, the NFC information is not acquired, and thus, the association unit 211 searches, among the association data 221 stored in the storage unit 22, association data 221 including the same touch ID as that of the acquired touch information, however, as NFC is not performed between the card 30 and the information processing device 1a, such association data 221 is not stored in the storage unit 22.

Here, when there is no association data 221 including the same touch ID as that of the acquired touch information, the association unit 211 according to the present modification confirms whether a coordinate included in the acquired touch information is within a predetermined range. Here, the predetermined range in the present modification is an area illustrated in A of FIG. 15, where the card 30 is placed (in other words, the area of the guiding image of A of FIG. 14), however, the predetermined range changes depending on the application 222, without being limited to this example. The association unit 211 acquires information about the predetermined range in advance from the application execution unit 212 to confirm whether a coordinate included in the acquired touch information is within the predetermined range. Note that, the information about the predetermined range is stored in the storage unit 22 and thus, the association unit 211 may acquire the information directly from the storage unit 22.

When the coordinate included in the acquired touch information is within the predetermined range, the association unit 211 confirms whether touch information including the same touch ID as that of the acquired touch information is already stored in the storage unit 22. When the information is not stored, the association unit 211 temporarily stores the acquired touch information in the storage unit 22. Note that, a case in which the information is already stored is described later. On the other hand, when the coordinate is not within the predetermined range, the association unit 211 deletes the acquired touch information.

Subsequently, as illustrated in B of FIG. 15, when the user tilts each card 30, the touch information generation unit 122 generates touch information including the angle of the card 30 after tilting and outputs the touch information to the association unit 211. Also in the case of this touch information, there is no association data 221 including the same touch ID and thus, the association unit 211 confirms whether the coordinate included in the acquired touch information is within the predetermined range. In this case, the coordinate is within the predetermined range, and then, the association unit 211 confirms whether touch information including the same touch ID as that of the acquired touch information is already stored in the storage unit 22. In this case, touch information including the same touch ID as that of the acquired touch information (touch information of the card 30 before the user changes the angle) is stored in the storage unit 22. At this point, the association unit 211 updates the touch information stored in the storage unit 22, by the newly acquired touch information.

Subsequently, as illustrated in C of FIG. 15, the user moves the card 30 to the position of an active NFC antenna 114 while keeping the contact to the NFC display 11a. Then, as a result of Near field radio communication being performed between the card 30 and the information processing device 1, the association unit 211 outputs the association data 221 to the application execution unit 212, together with storing the association data 221 in the storage unit 22.

Upon the association data 221 being acquired, the application execution unit 212 retrieves the touch information stored in the storage unit 22. Then, the application execution unit 212 identifies the answer from the user by referring to the angle included in the retrieved touch information and to answer database. Furthermore, the application execution unit 212 identifies a correct answer to the question by referring to the terminal data included in the acquired association data 221. Then, the application execution unit 212 determines whether the answer from the user is correct by comparing the identified answer from the user to the correct answer, and outputs, to the image generation unit 213, a generation instruction of an image, based on the determination result.

The image generation unit 213 generates the image in accordance with the instruction and outputs the generated image to the display driving unit 23. Then, the display driving unit 23 displays the image generated by the image generation unit 213 on the display unit 113. Thereby, as illustrated in D of FIG. 15, an image illustrating whether the answer from the user is correct, is displayed on the display unit 113. In the case of the example in D of FIG. 15, as the number of the card 30 is 10, the image "○ Great!" indicating that the answer from the user is correct, is displayed on the display unit 113.

Process Sequence When No Association Data Includes Same Touch ID as That of Touch Information Next, a sequence of a process for a case in which there is no association data including the same touch ID as that of the touch information, will be described with reference to FIG. 16. FIG. 16 is a flow chart illustrating a sequence of a process following "A" included in the flow chart illustrated in FIG. 10.

First, when there is no association data including the same touch ID as that of the touch information (NO in S16 of FIG, 10), the association unit 211 determines whether the touch coordinate included in the acquired touch information is within a predetermined range (S21), When the coordinate is within the predetermined range (YES in S21), the association unit 211 confirms whether touch information including the same touch ID as that of the acquired touch information is stored in the storage unit 22 (S22). When the information is not stored (NO in S22), the association unit 211 temporarily stores the acquired touch information in the storage unit 22 (S23). On the other hand, when the information is stored (YES in S22), the touch information stored in the storage unit 22 is updated by the acquired touch information (S24).

On the other hand, when the touch coordinate included in the acquired touch information is not within the predetermined range (NO in S21), the acquired touch information is deleted (S25).

Another Modification of Third Embodiment

The information processing device 1a according to the present embodiment may specify whether a rectangular NFC terminal is oriented vertically or horizontally and may execute a process in accordance with the specified orientation. In this case, the touch information generation unit 122 specifies whether the long side of the NFC terminal is approximately parallel or approximately perpendicular to the long side of the NFC display 11a. Then, the touch information generation unit 122 generates touch information further including the "orientation" of the NFC terminal. The application execution unit 212 specifies whether the NFC terminal is oriented vertically or horizontally by referring to the association data 221 including the touch information.

Furthermore, the information processing device 1a according to the present embodiment may specify whether the NFC terminal has rotated to the right or to the left and may execute the process in accordance with the specified orientation. In this case, the association unit 211 does not delete at least two pieces of touch information (or association data 221 including the touch information) obtained when the NFC terminal rotates, and holds the touch information in the storage unit 22. The application execution unit 212 specifies whether the NFC terminal has rotated to the right or to the left, in accordance with how an angle included in the at least two held pieces of the touch information has changed. Specifically, when the angle changes to become larger, the application execution unit 212 specifies that the NFC terminal has rotated to the right. On the other hand, when the angle changes to become smaller, the application execution unit 212 specifies that the NFC terminal has rotated to the left.

Furthermore, a constitution described in the present embodiment can also be applied to the information processing device described in the first embodiment, that is, the information processing device 1.

Fourth Embodiment

Still another embodiment of the present invention will be described below, based on FIG. 17. Note that, for simplicity, components illustrated in the above-described embodiments are designated by the same reference numerals as those having the same function, and description thereof is omitted.

In the first embodiment, a method for preventing deletion of association data due to unintentional contact disruption is described for the case of the information processing device 1, that is, when there is one NFC antenna 114. On the other hand, in the present embodiment, a method for preventing deletion of association data due to unintentional contact disruption is described for the case of the information processing device 1a, that is, when there are a plurality of NFC antennas 114.

Figure 17:
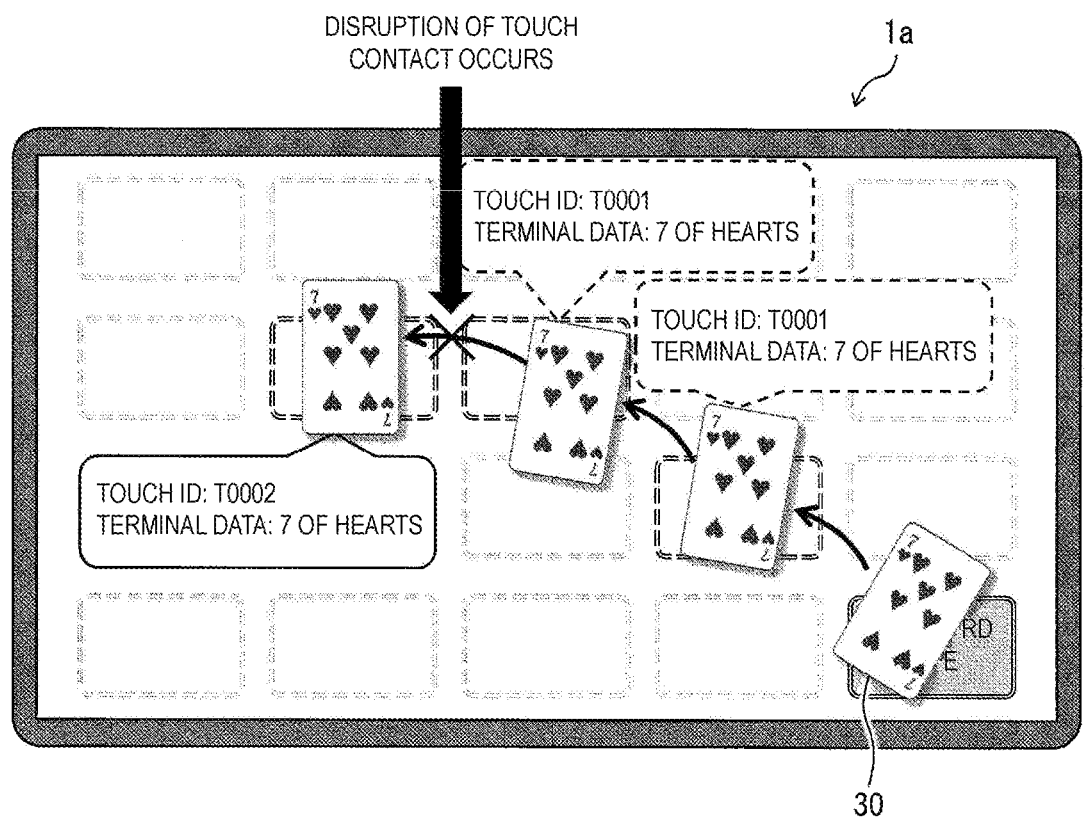
FIG. 17 is a diagram illustrating a method of preventing deletion of association data due to an unintentional contact disruption in a forth embodiment.

FIG. 17 is a diagram illustrating a method for preventing deletion of association data due to the unintentional contact disruption according to the present embodiment. Among items illustrated in the rectangle (the NFC display 11a of the information processing device 1a) in FIG. 17, a card corresponds to the NFC terminal placed on the NFC display 11, and another item is an image displayed by the NFC display 11.

Figure 16:
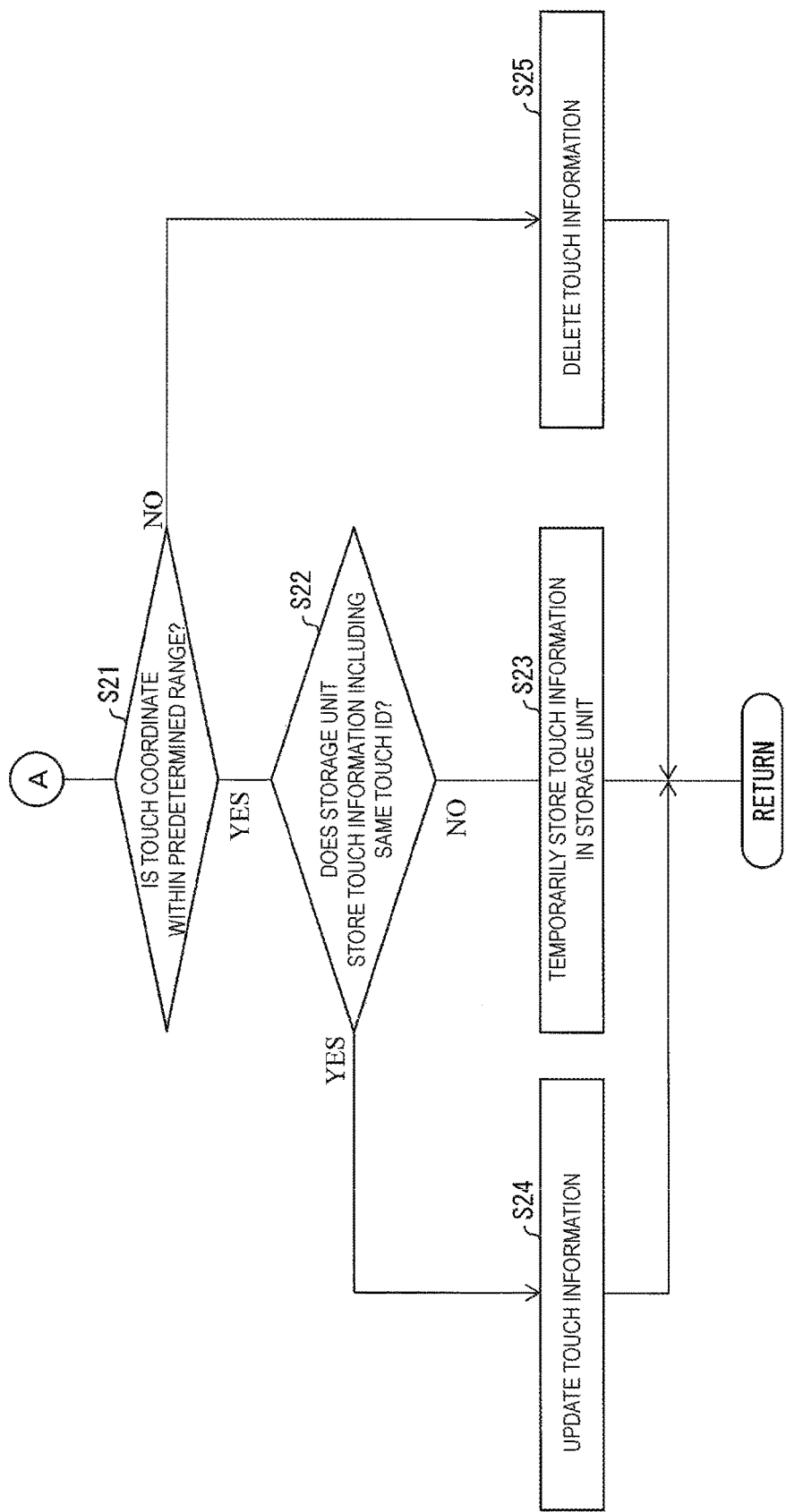
FIG. 16 is a flow chart illustrating a sequence of a process following "A" included in the flow chart illustrated in FIG. 10.

Upon NFC information being acquired from the NFC antenna 114 (the NFC antenna 114 at the bottom right of FIG. 16) in which the guiding image of FIG. 16 is displayed, the NFC control unit 13 of the information processing device 1a according to the present embodiment also activates all other NFC antennas 114. Thereby, when the NFC terminal (the card 30) moves while keeping the contact with the information processing device 1, each time the NFC terminal passing over the NFC antenna 114, Near field radio communication is executed between the card 30 and the information processing device 1a. In other words, each time the card 30 passes over the NFC antenna 114, the NFC control unit 13 generates NFC information and outputs the generated information to the association unit 211.

On the other hand, the touch information generation unit 122 continuously generates touch information and outputs the generated information to the association unit 211. Thus, a situation in which the association unit 211 simultaneously acquires touch information and NFC information, will occur a plurality of times. Each time the association unit 211 according to the present embodiment simultaneously acquires touch information and NFC information, the association unit 211 generates association data 221 and stores the generated data in the storage unit 22. Thereby, as illustrated in FIG. 17, even though an unintentional contact disruption occurs, when the card 30 passes over the NFC antenna 114 afterwards, the touch information and the NFC information become again associated. Thus, as the user does not need to bring the card 30 again into contact with the touch panel 111 at the position of the NFC antenna 114, convenience for the user is improved.

Note that, in the present embodiment, a constitution was described in which all NFC antennas 114 are activated, however, when the NFC control unit 13 can acquire beforehand information about a position where the NFC terminal moves, a constitution may be such that the NFC control unit 13 specifies a movement pathway of the NFC terminal and activates only the NFC antenna 114 on the movement pathway. Specifically, upon being capable of specifying, in the application 222 to be executed (for example, when the application 222 to be executed is the application 222b indicated in the third embodiment), a position where the NFC terminal moves, the application execution unit 212 outputs, to the NFC control unit 13, a coordinate where the NFC terminal moves. The NFC control unit 13 uses the acquired coordinate where the NFC terminal moves to specify the movement pathway and activates only the NFC antenna 114 on the movement pathway.

Furthermore, the application execution unit 212 (an antenna condition configuration unit) may specify an NFC antenna 114 closest to the coordinate indicated by the touch information included in the acquired association data 221, and instruct the NFC control unit 13 to activate the NFC antenna 114.

Modification Common to First to Fourth Embodiments

In the first to fourth embodiments, examples in which the NFC terminal is the card 30 have been explained, but the NFC terminal is not limited to a card. Specifically, the NFC terminal changes in accordance with the application 222 executed by the information processing device 1 (or information processing device 1a).

For example, when the application 222 is a trading card game, a trading card becomes the NFC terminal. The trading card holds, for example, character information, an image, a status, and the like as terminal data. The information processing device 1 acquires from such a trading card, by NFC, the image of the character, the status of the character, and the like, and can display a production in accordance with this acquired information on the display unit 113.

Furthermore, the NFC terminal is not limited to a terminal in the form of a card. For example, it is also possible to achieve an application 222 of a board game in which a game piece is the NFC terminal. The game piece holds, for example, information on the game piece, an image, a status, and the like as terminal data. The information processing device 1 acquires from such a game piece, by NFC, the image of the game piece, the status of the game piece, and the like, and can display a production in accordance with this acquired information on the display unit 113.

As described above, with the information processing device 1 according to the present invention, it is possible to achieve an application combining real objects such as cards, trading cards, or game pieces, with digital data. Thus, the user can experience more real games.

Apart from that, a smart phone, a tablet terminal, and the like can also be given as an example for the NFC terminal. Furthermore, the NFC terminal may include a grip that the user can grasp. Thereby, when moving the NFC terminal brought into contact with the NFC display 11, the user can grasp the grip to move the NFC terminal. Thus, the NFC terminal can easily move with being in contact with the NFC display 11.

Furthermore, in the first to fourth embodiments, a constitution is described in which the touch panel 111 and the NFC unit 112 are formed separately, however, the touch panel 111 and the NFC unit 112 may be formed integrally with each other. For example, a constitution may be such that the NFC antenna 114 is included in the touch panel 111.

Other Modifications

Figure 18:
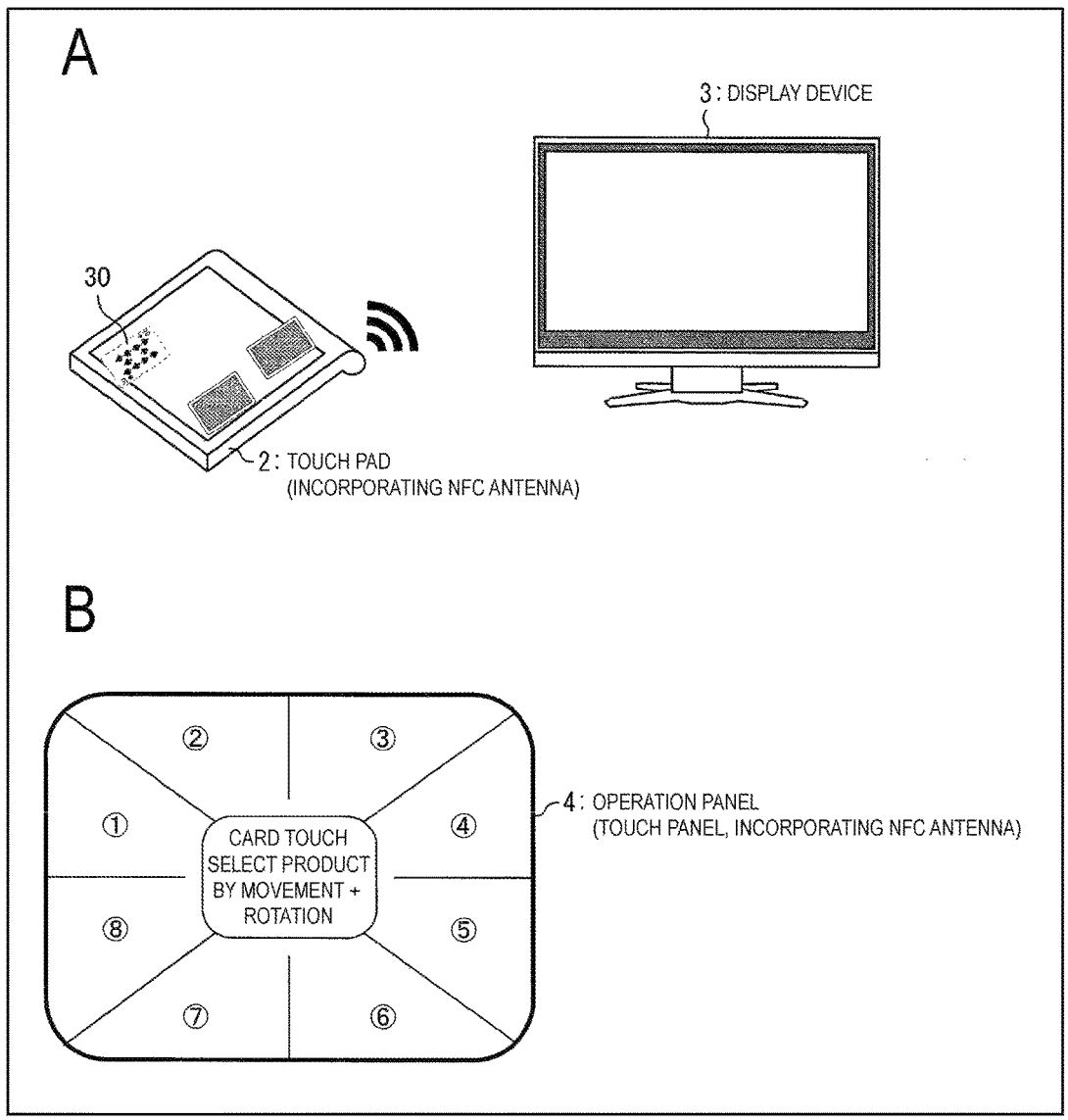
FIG. 18 is a diagram illustrating a modification of the present invention.

A modification of the present invention will be described below, with reference to FIG. 18. FIG. 18 is a diagram illustrating the modification of the present invention.

As illustrated in FIG. 18, the information processing device of the present invention may not include a display device (display). For example, as illustrated in A of FIG. 18, the information processing device of the present invention may be a touch pad 2 incorporating an NFC antenna. The touch pad 2 is constituted to be capable of communication with a display device 3 and displays an image reflecting touch information and NFC information on the display device 3, by transmitting, to the display device 3, the touch information of an NFC terminal placed on the touch pad 2 (a card in the example of FIG. 18) and the NFC information.

Thus, it is possible to display the image reflecting the touch information and the NFC information on the display device 3 even when the display device 3 is arranged far from the touch pad 2 or when the NFC terminal cannot be placed on the display device 3 as illustrated in FIG. 18. Note that, for the application in the example of A of FIG. 18, an application such as a card game or a board game is assumed.

Furthermore, as illustrated in B of FIG. 18, the information processing device may be an operation panel 4 incorporating a touch panel and an NFC antenna. The entire surface of the operation panel 4 illustrated in B of FIG. 18 is a touch panel. Moreover, the center of the operation panel 4 includes an NFC antenna on which to touch the NFC terminal (card) and a guidance for touching the card on the NFC antenna. Furthermore, the surrounding area is divided into eight parts, indicated by the numbers one to eight. Note that, the operation panel 4 is not limited to the example of B of FIG. 18.

The user touches the card on the center part of the operation panel 4 and then performs an operation by moving or rotating the card in a predetermined direction. For example, the operation panel 4 is mounted in a vending machine. Upon the user touching the card on the center part of the operation panel 4, the operation panel 4 acquires payment information. Furthermore, the operation panel 4 specifies a product depending on a coordinate of the touch information acquired by the user moving the card to an area having the number corresponding to a desired product. Then, a purchase process is executed for the product depending on an angle of the touch information acquired by the user rotating the card.

Note that, the operation panel 4 mounted in a vending machine and a user operation for purchasing a product, are not limited to the example above.

Realization Example by Software

A control block of the information processing device 1 (in particular, the signal information processing unit 12, the NFC control unit 13, and the control unit 21) may be realized by a logic circuit (hardware) formed by an integrated circuit (IC chip) and the like, or by software by using a CPU (central processing unit).

In the latter case, the information processing device 1 includes: a CPU configured to execute a command of a program, that is software to realize each function; a Read Only Memory (ROM) or a storage device (these are referred to as "recording medium") in which the program and various types of data are recorded in a manner readable by a computer (or CPU); and a Random Access Memory (RAM) to develop the program. Then, when the computer (or CPU) reads the program from the recording medium and executes the program, an object of the present invention is achieved. As the recording medium, a "non-transitory tangible medium", for example, a tape, a disk, a card, a semiconductor memory, a programmable logic circuit, and the like can be used. Further, the program may be supplied to the computer via any transmission medium (a communication network, a broadcast wave, and the like) capable of transmitting the program. Note that the present invention may be realized in a mode of a data signal embodied by electronically transmitting the program, where the data signal is embedded in a carrier wave.

Summary

An information processing device 1 according to a first aspect of the present invention includes: a terminal information acquisition unit (association unit 211) configured to acquire, from a client device, via a communication unit (NFC unit 112) configured to perform Near field radio communication, terminal information held by the client device placed over a touch panel 111; a position information acquisition unit (association unit 211) configured to acquire position information including information on a position at which the client device comes into contact with or approaches the touch panel; and an association unit (association unit 211) configured to associate the terminal information and the position information and store a result of the association.

According to the constitution above, the terminal information held by the client device and acquired by the Near field radio communication is associated with the position information including information on the position at which the client device comes into contact with or approaches the touch panel. The information resulting from the association is stored and thus, it is possible to perform a process by linking the terminal information with the position information.

In an information processing device according to a second aspect of the present invention, in the first aspect, upon the client device moving on the touch panel while keeping the contact or the approached state, the association unit may update the position information associated with the terminal information in accordance with the movement.

According to the constitution above, when the client device moves, the position information associated with the terminal information is updated in accordance with the movement.

Thus, position information including information on the latest position of the client device is associated with the terminal information. Therefore, even when the client device has moved on the touch panel after Near field radio communication, the information processing device can recognize the position of the client device. Thus, it is possible to perform a process by linking the terminal information with the movement of the client device.

In an information processing device according to a third aspect of the present invention, in the first or second aspect, the terminal information is further associated with angle information indicating an angle formed by a first axis configured on the touch panel and a second axis that is an axis on the same plane as the first axis and specified on the basis of the contour of the client device, and the resulting information is stored. When the angle of the client device is changed while keeping the contact or the approached state, the association unit may update the angle information associated with the terminal information, in accordance with the change.

According to the constitution above, when the angle of the client device has changed, the angle information associated with the terminal information is updated in accordance with the change.

Thus, angle information indicating the latest angle of the client device is associated with the terminal information. Therefore, even when the angle of the client device on the touch panel changes after Near field radio communication, the information processing device can recognize the angle (slant) of the client device. Thus, it is possible to perform a process by linking the terminal information with the change in the angle of the client device.

In an information processing device according to a fourth aspect of the present invention, in any one of the first to third aspects, the association unit may release the association between the terminal information and the position information when a predetermined time has elapsed since disruption of the contact or the approached state of the client device.

According to the constitution above, the association between the terminal information and the position information is released when the predetermined time has elapsed since the disruption of the contact or the approached state of the client device.

That is, when a user wants to release the association between the terminal information and the position information, the user may disrupt the contact or the approached state between the client device and the touch panel and may keep the disrupted state for the predetermined time. As described above, it is possible to release the association between the terminal information and the position information by a simple method.

In an information processing device according to a fifth aspect of the present invention, in the fourth aspect, when the position information acquisition unit has acquired second position information of the client device before the predetermined time has elapsed after the disruption of the contact or the approached state of the client device at a first position on the touch panel, at least upon a difference between a second position indicated by the second position information and the first position being within a predetermined range, the association unit may update position information associated with the terminal information, by the second position information.

According to the constitution above, when the client device is again brought into contact with or approached to the touch panel before the predetermined time elapses, upon the difference between the second position indicated by the second position information acquired in accordance with the contact or the approached state, and the first position at which the contact or the approached state is released, being within the predetermined range, the second position information is associated with the terminal information.

Thus, even when the user has unintentionally disrupted the contact or the approached. state between the client device and the touch panel, that is, even when the user has unintentionally separated the client device and the touch panel from each other by a predetermined distance or more, upon the client device coming into contact with or approaching the touch panel again within the predetermined time in the vicinity of the position at which the contact or the approached state was disrupted, it is possible to associate the terminal information and position information indicating a position at which the contact or the approached state is re-established.

That is, even when the user has unintentionally disrupted the contact or the approached state between the client device and the touch panel, it is not necessary to perform again Near field radio communication by the client device. Thus, it is possible to improve user convenience.

An information processing device according to a sixth aspect of the present invention, in the fifth aspect, further includes a size determination unit (association unit 211) configured to determine the size of a facing surface of the client device facing the touch panel. When a difference between the size of a facing surface of the client device at the first position and the size of a facing surface of the client device at the second position is within a predetermined range, the association unit may further update the position information associated with the terminal information, by the second position information.

According to the constitution above, when the difference of a facing surface of the size of the client device as well as the position of the client device is within the predetermined range, the association unit may update the position information associated with the terminal information, by the second position information.

Thereby, it is possible to determine more precisely, for a re-established association after the contact or the approached state between the client device and the touch panel is once disrupted, whether a client device again brought into contact with or approaching the touch panel is the client device in which the contact or the approached state was disrupted recently.

Note that, the above-mentioned "size" may be the area of the facing surface of the client device facing the touch panel, or may he the length of the short side and the long side, or only the length of the long side when the facing surface is rectangular.

An information processing device according to a seventh aspect of the present invention, in the sixth aspect, further includes a shape determination unit (association unit 211) configured to determine the shape of the facing surface. When the shape of the facing surface at the first position and the shape of the facing surface at the second position are identical, the association unit may further update the position information associated with the terminal information, by the second position information.

According to the constitution above, upon the difference of the position and the size of the client device being within the predetermined range, and further, the shape of the client device being identical, the position information associated with the terminal information is updated by the second position information.

Thereby, it is possible to determine even more precisely for a re-established association after the contact or the approached state between the client device and the touch panel was once disrupted, whether a client device again brought into contact with or approaching the touch panel is the client device in which the contact or the approached state was disrupted recently.

In an information processing device according to an eighth aspect of the present invention, in any one of the first to seventh aspects, the association unit may associate the terminal information and the position information and store a result of the association upon determining that an object brought into contact with or being approached to the touch panel is the above-described client device.

According to the constitution above, upon determining that the object brought into contact with or being approached to the touch panel is the client device, the association unit associates the terminal information and the position information and stores a result of the association. In other words, when the above-mentioned object is not the client device, but, for example, the finger of a user, or the like, the terminal information and the position information are not being associated.

Thereby, even when another object conies into contact with or approaches the touch panel while the client device is in contact or in the approached state with the touch panel, the terminal information is not associated with the position information based on the contact or the approached state. Thus, it is possible to prevent an erroneous association of the terminal information and the position information.

In an information processing device according to a ninth aspect of the present invention, in any one of the first to eighth aspects, the communication unit includes a plurality of antennas (NFC antennas 114) configured to perform Near field radio communication with the client device. When a plurality of the client devices simultaneously have performed Near field radio communication, the association unit may associate: terminal information acquired by an antenna that, among the antennas having performed Near field radio communication, is closest to the position at which the client device comes into contact with or approaches the touch panel; and the position information of a client device closest to the antenna.

According to the constitution above, when the plurality of client devices simultaneously have performed Near field radio communication, the association unit associates: terminal information acquired by an antenna that, among the antennas having performed Near field radio communication, is closest to the position at which the client device comes into contact with or approaches the touch panel; and position information of the client device closest to the antenna.

Thereby, even when the plurality of client devices simultaneously perform Near field radio communication, it is possible to correctly specify and associate a combination of terminal information and position information.

In an information processing device according to a tenth aspect of the present invention, in any one of the first to ninth aspects, the communication unit includes a plurality of antennas configured to perform Near field radio communication with the client device and the information processing device may further include an antenna condition configuration unit (application execution unit 212) configured to bring an antenna closest to the position indicated by the position information of the client device into a state of Near field radio communication with the client device being possible.

According to the constitution above, the antenna closest to the position indicated by the position information of the client device enters a state of Near field radio communication with the client device being possible (active). Thereby, when the client device is moved on the touch panel, the antenna is activated corresponding to the movement.

Thus, even when the contact or the approached state of the client device and the touch panel is once disrupted and the association between the terminal information and the position information is deleted, upon the contact or the approached state being re-established afterwards, it is possible to acquire the terminal information by the antenna closest to the client device and thus, it is possible to associate the terminal information and the position information again.

A control method of an information processing device according to an eleventh aspect of the present invention includes: a terminal information acquisition step (S13) of acquiring from a client device via a communication unit configured to perform Near field radio communication, terminal information held by the client device placed over a touch panel; a position information acquisition step (S11) of acquiring position information including information on a position at which the client device comes into contact with or approaches the touch panel; and an association step (S14) of associating the terminal information and the position information and storing a result of the association.

The control method of the information processing device according to the eleventh aspect provides the same operation and effect as the information processing device according to the first aspect.

The information processing device according to each aspect of the present invention may be realized by a computer. In this case, a control program of the information processing device and a computer-readable recording medium fall within the scope of the present invention. The control program is configured to realize, by a computer, the information processing device by operating the computer as each unit (software element) included in the information processing device. The computer-readable recording medium is configured to store the control program.

The present invention is not limited to each of the above-described embodiments. It is possible to make various modifications within the scope of the claims. An embodiment obtained by appropriately combining technical elements each disclosed in different embodiments falls also within the technical scope of the present invention. Further, when technical elements each disclosed in the respective embodiments are combined, it is possible to form a new technical feature.

INDUSTRIAL APPLICABILITY

The present invention can be used for an information processing device configured to process information acquired from a client device through Near field radio communication by a display device including a communication unit configured to perform Near field radio communication.

REFERENCE SIGNS LIST

1 Information processing device
10 Display device
111 Touch panel
112 NFC unit (Communication unit)
114 Antenna (NFC antenna)
211 Association unit (Terminal information acquisition unit, Position information acquisition unit, Association unit, Shape determination unit)
212 Application execution unit (Antenna condition configuration unit)
S11 Position information acquisition step
S13 Terminal information acquisition step S14 Association step

The invention claimed is:

1. An information processing device, comprising:
terminal information acquisition circuitry configured to acquire, from a client device, via communication circuitry configured to perform Near field radio communication, terminal information held by the client device placed over a touch panel;
position information acquisition circuitry configured to acquire position information including information on a position on the touch panel, the client device coming into contact with or approaching the position; and
association circuitry configured to
associate the terminal information and the position information and store a result of the association, and
release the association between the terminal information and the position information upon a predetermined time elapsing after disrupting the contact or the approached state of the client device, wherein
when the position information acquisition circuitry acquires second position information of the client device before the predetermined time elapses after disrupting the contact or the approached state of the client device at a first position on the touch panel, at least upon a difference between a second position indicated by the second position information and the first position being within a predetermined range, the association circuitry updates the position information associated with the terminal information, by the second position information.

2. The information processing device according to claim 1, wherein, upon the client device moving on the touch panel while keeping the contact or the approached state, the association circuitry updates the position information associated with the terminal information in accordance with the movement.

3. The information processing device according to claim 1, wherein
the terminal information is further associated with angle information indicating an angle formed by a first axis configured on the touch panel and a second axis being an axis on the same plane as the first axis and being specified on the basis of a contour of the client device, and the resulting information is stored, and
upon the angle of the client device changing while keeping the contact or the approached state, the association circuitry updates the angle information associated with the terminal information, in accordance with the change.

4. The information processing device according to claim 1, further comprising size determination circuitry configured to determine a size of a facing surface of the client device facing the touch panel, wherein
upon a difference between a size of a facing surface of the client device at the first position and a size of a facing surface of the client device at the second position being within a predetermined range, the association circuitry further updates the position information associated with the terminal information, by the second position information.

5. The information processing device according to claim 4, further comprising shape determination circuitry configured to determine a shape of the facing surface, wherein
upon a shape of the facing surface at the first position and a shape of the facing surface at the second position being identical, the association circuitry further updates the position information associated with the terminal information, by the second position information.

6. The information processing device according to claim 1, wherein the association circuitry associates the terminal information and the position information and stores a result of the association upon determining that an object brought into contact with or being approached to the touch panel is the client device.

7. The information processing device according to claim 1, wherein
the communication circuitry comprises a plurality of antennas configured to perform Near field radio communication with the client device, and
upon a plurality of the client devices simultaneously having performed Near field radio communication, the association circuitry associates terminal information acquired by an antenna being closest to a position, the client device coming into contact with or approaching the position, among the antennas having performed Near field radio communication, and the position information of a client device closest to the antenna.

8. The information processing device according to claim 1, wherein
the communication circuitry comprises a plurality of antennas configured to perform Near field radio communication with the client device, and
the information processing device further comprises antenna condition configuration circuitry configured to bring an antenna closest to the position indicated by the position information of the client device into a state of Near field radio communication with the client device being possible.

9. A non-transitory computer-readable recording medium recording a control program for causing a computer to function as the information processing device according to claim 1, wherein the computer is caused to function as the terminal information acquisition circuitry, the position information acquisition circuitry, and the association circuitry.

* * * * *